(12) United States Patent
Byrne et al.

(10) Patent No.: US 11,044,549 B1
(45) Date of Patent: Jun. 22, 2021

(54) SUPERCOUPLING POWER DIVIDERS, AND METHODS FOR MAKING AND USING SAME

(71) Applicant: The Government of the United States of America, as represented by the Secretary of the Navy, Arlington, VA (US)

(72) Inventors: Matthew S. Byrne, Austin, TX (US); Hussein Esfahlani, Lausanne (CH); Andrea Alu, Austin, TX (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/702,328

(22) Filed: Dec. 3, 2019

Related U.S. Application Data

(60) Provisional application No. 62/774,639, filed on Dec. 3, 2018.

(51) Int. Cl.
*H04R 1/28* (2006.01)
*H04R 1/34* (2006.01)

(52) U.S. Cl.
CPC ........... *H04R 1/2857* (2013.01); *H04R 1/345* (2013.01)

(58) Field of Classification Search
CPC .......... H04R 1/20; H04R 1/28; H04R 1/2803; H04R 1/2853; H04R 1/2857; H04R 1/30; H04R 1/32; H04R 1/34; H04R 1/345; H04R 1/42; G10K 11/02; G10K 11/025; G10K 11/18; G10K 11/22; G10K 11/26; G10K 11/28

See application file for complete search history.

(56) References Cited

U.S. PATENT DOCUMENTS

| | | | |
|---|---|---|---|
| 5,540,248 A * | 7/1996 | Drzewiecki | F15C 1/04 137/14 |
| 2003/0132056 A1* | 7/2003 | Meyer | H04R 1/30 181/187 |
| 2011/0211720 A1* | 9/2011 | Adams | H04R 1/403 381/339 |
| 2013/0343564 A1* | 12/2013 | Darlington | H04R 1/1083 381/74 |
| 2016/0212523 A1* | 7/2016 | Spillmann | H04R 1/345 |
| 2020/0154198 A1* | 5/2020 | Schneider | H04R 1/345 |

* cited by examiner

*Primary Examiner* — Thang V Tran
(74) *Attorney, Agent, or Firm* — Dawn C. Russell

(57) ABSTRACT

Supercoupling power dividers are provided, in which acoustic impedance at an acoustic input port matches the combined acoustic impedance at two or more acoustic output ports, and the phase of the input signal matches the combined phases of the two or more acoustic output ports. Methods for achieving impedance matching using a uniform-phase acoustic power divider are also provided. The devices and methods achieve acoustic supercoupling without requiring embedded membranes or resonators.

20 Claims, 20 Drawing Sheets

US 11,044,549 B1

SUPERCOUPLING POWER DIVIDERS, AND METHODS FOR MAKING AND USING SAME

CROSS-REFERENCES TO RELATED APPLICATIONS

This application claims priority under 35 U.S.C. § 119(e) to U.S. Provisional Application No. 62/774,639, filed on Dec. 3, 2018. The entire contents of this application are incorporated herein by reference.

This application is also related to counterpart Non-Provisional application Ser. No. 16/702,264 titled "Supercoupling Waveguides, and Methods for Making and Using Same," filed on Dec. 3, 2019 (Navy Case No. 108,764). The entire contents of this application are incorporated herein by reference.

FIELD OF THE INVENTION

Supercoupling power dividers are provided, in which acoustic impedance at an acoustic input port matches the combined acoustic impedance at two or more acoustic output ports, and the phase of the input signal matches the combined phases of the two or more acoustic output ports. The supercoupling power dividers may be used in methods of sensing and measuring, and may be incorporated into sensor devices.

BACKGROUND OF THE INVENTION

Over the past decade, significant attention has been paid to zero-index metamaterials (ZIMs), due their extreme capabilities for wave manipulation (N. Engheta, "Pursuing near-zero response," Science, vol. 340, no. 6130, pp. 286-287, 2013). These materials can be described by governing equations that are temporally and spatially decoupled, due to the unusual physics enabled by near-zero constitutive parameters.

Supercoupling in electromagnetics has been achieved in part because conducting waveguides naturally support effective zero-index properties at the cut-off of their dominant mode of propagation. This phenomenon has enabled electromagnetic supercoupling, without having to realize a metamaterial through periodic arrays of small inclusions, by operating a hollow waveguide at cut-off. Unfortunately, conventional acoustic waveguides typically do not provide a cut-off for their dominant propagating mode, as these modes are longitudinal in nature.

The analogue of zero-permittivity in acoustics, for the realization of acoustic supercoupling, is density-near-zero metamaterials. One approach theoretically showed that energy could be squeezed through ultranarrow acoustic channels by employing a waveguide filled with arrays of transverse membranes (R. Fleury and A. Alu, "Extraordinary sound transmission through density-near-zero ultranarrow channels," *Phys. Rev. Lett.* 111, 055501 (2013)), which indeed realized an effective zero-density ultranarrow channel.

However, challenges with viscothermal loss and the accurate tuning of multiple membrane resonances have prevented the practical realization of density-near-zero acoustic supercoupling devices. A waveguide loaded with Helmholtz resonators in the form of low-pass filters was shown to support compressibility-near-zero properties and uniform phase through an intermediate channel (N. Cselyuszka, et al., "Compressibility-near-zero acoustic metamaterial," *Phys. Lett. A* 378, 1153-1156 (2014)). In order to achieve supercoupling, extreme precision in these arrays of resonators would be required. It would be difficult and impractical to assemble acoustic power dividers with membranes and resonators that are incorporated with the required degree of precision to achieve acoustic supercoupling.

Power dividers are used for dividing signals between amplifier chains, for feeding networks in array antennas, and for the distribution of microwave signals to subsystems. Power dividers, as an essential part of the feeding network in array antennas, are classified in three different categories: parallel, series, and hybrid (parallel-series).

The design of antenna arrays with equal amplitude/phase excitation with a main beam at broadside is popular in telecommunications. The feeding network for such array antennas can be parallel, series or hybrid. Series power dividers are preferred when physical space is limited, because parallel-divider-based networks are usually bulky due to the three-port shape of the parallel power divider. In a series feed network, the meander line technique is leveraged to ensure that each antenna element is fed with an equal amplitude and equal phase signal. There is a requirement that the signal be sampled from the meander feed line at locations which are integer multiples of the guided wavelength. Therefore, although series power dividers have many advantages, they also have various drawbacks such as additional design complexity, restrictions imposed upon the placement of antenna elements in the array, and they must be custom tailored according to the number of elements.

Accordingly, there is a need in the art to provide acoustic series power dividers that are reduced in size and complexity, and achieve supercoupling without requiring the use of membranes or resonators.

SUMMARY OF THE INVENTION

The invention described herein, including the various aspects and/or embodiments thereof, meets the unmet needs of the art, as well as others, by providing supercoupling acoustic power dividers in which acoustic impedance at an acoustic input port matches the combined acoustic impedance at two or more acoustic output ports. The phase of the input signal may also match the combined phases of the two or more acoustic output ports. The supercoupling power dividers may be used for sensing and measurement, and incorporated into sensors. The devices and methods of the invention may achieve compressibility-near-zero (CNZ) acoustic supercoupling without embedded membranes or resonators.

According to a first aspect of the invention, supercoupling power dividers are provided. The power dividers include an acoustic input port having an input cross-sectional area, where the acoustic input port is adapted for receiving an acoustic signal having an impedance; two or more acoustic output ports, each acoustic output port having an output cross-sectional area, where the combined output cross-sectional areas of the two or more output ports is equal to the input cross-sectional area, and where the two or more acoustic output ports are adapted for transmitting the acoustic signal; and an acoustic path extending from the acoustic input port to the two or more acoustic output ports, the acoustic path having a variable length and a path cross-sectional area that is greater than the first cross-sectional area. The acoustic impedance at the acoustic input port is equal to the combined acoustic impedances at the two or more acoustic output ports.

Another aspect of the invention provides methods for achieving supercoupling in an acoustic path. The methods include providing an acoustic path comprising a an air-filled channel and a boundary layer comprising a material having a Young's modulus (E) that is about 200 GPa or greater, where the acoustic path has an acoustic input port and at least two acoustic output ports; and providing a signal having an impedance at the acoustic input port, where the signal is transmitted through the acoustic path to the at least two acoustic output ports. The total signal at the at least two acoustic output ports has an impedance equal to the impedance of the signal at the acoustic input port.

Another aspect of the invention provides methods for achieving acoustic supercoupling without the use of membranes or resonators.

A further aspect of the invention provides methods for achieving impedance matching using a uniform-phase acoustic power divider.

Other features and advantages of the present invention will become apparent to those skilled in the art upon examination of the following or upon learning by practice of the invention.

DETAILED DESCRIPTION OF THE INVENTION

The invention is directed to supercoupling acoustic power dividers. In the supercoupling power dividers of the invention, the acoustic impedance at an acoustic input port matches the combined acoustic impedance at two or more acoustic output ports, and the phase of the input signal matches the combined phases of the two or more acoustic output ports.

Methods for achieving acoustic supercoupling, and matching acoustic impedance at an input waveguide port with the combined acoustic impedance of one or more output ports, are also provided.

Metamaterials are artificial materials made using sub-wavelength microstructures that exhibit properties not found in naturally-occurring materials. Sound waves travelling through materials are primarily controlled via bulk modulus (#), mass density (p), and chirality. Acoustic metamaterials control, direct and manipulate sound waves in gases, liquids, and solids. Acoustic zero-index meta-materials (ZIMs) and near-zero-index meta-materials (near-ZIMs) can be designed to function as a total reflector or a total transmitter, and have been demonstrated, for example, by using periodic structures to create a Dirac cone at the F point of the Brillouin zone. In accordance with the present invention, acoustic metamaterials exhibit hard acoustic boundary conditions (i.e., a large impedance mismatch between the filling medium and surrounding medium) and preferably have a refractive index that is nearly zero, and more preferably have a refractive index of zero.

The devices and methods of the invention beneficially achieve acoustic supercoupling without requiring the use of embedded membranes or resonators. The invention avoids and/or eliminates the need to use membranes or resonators within the power dividers of the invention. Although membranes and resonators (e.g., low-pass filters) can be used to create an array of membranes that resonate at the same frequency, in practice it is difficult to incorporate them in a manner such that they will vibrate at exactly the same frequency. The attachment of membranes within the power divider can cause irregularities that may prevent supercoupling.

Power Dividers.

The acoustic power dividers of the invention are based on advances of electromagnetic near-zero index media and the infinite-wavelength phenomenon of an acoustic wave in a compressibility-near-zero (CNZ) medium.

The invention utilizes a CNZ supercoupling medium to design an N-port acoustic series power divider. The acoustic series power dividers of the invention beneficially provide significant size reductions as compared to meander line series power dividers.

Figure 1:
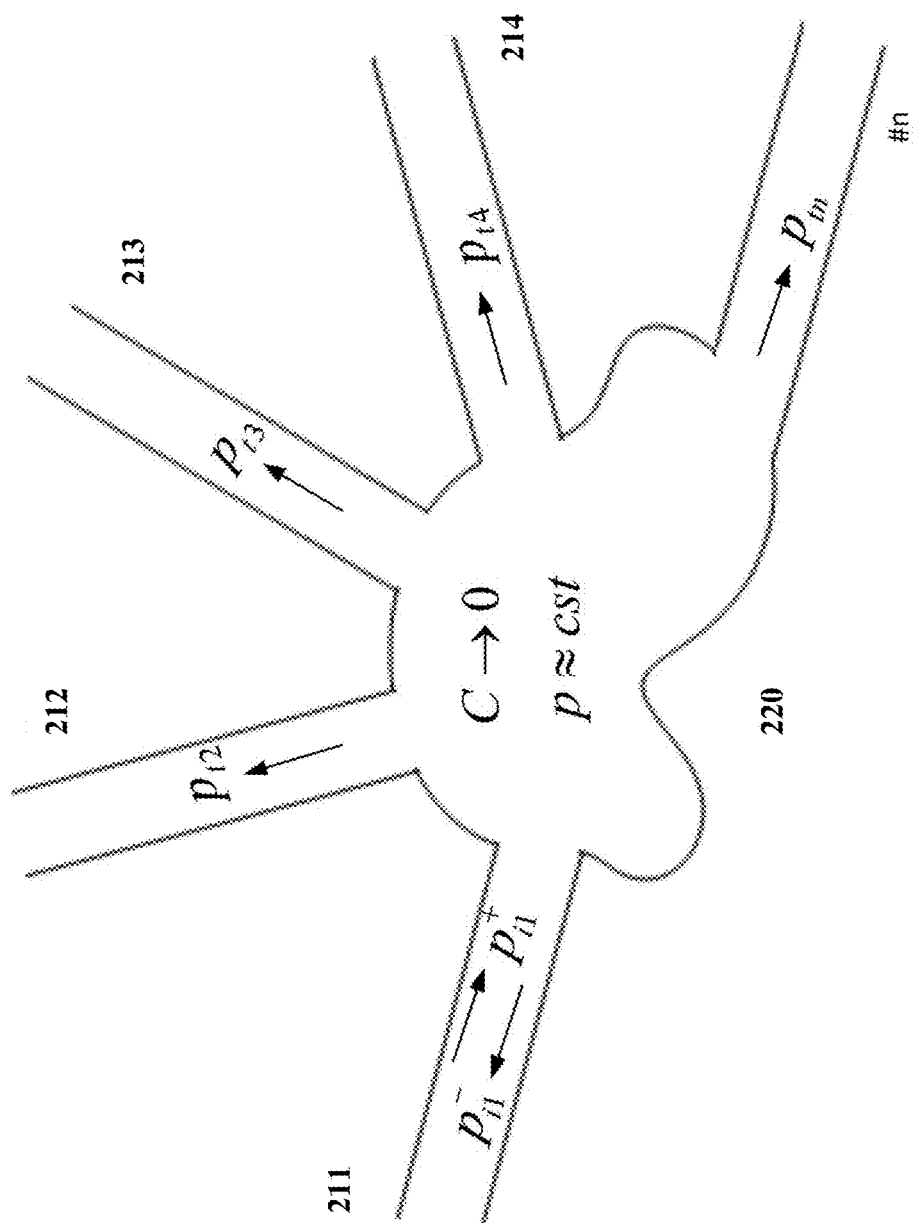
FIG. 1 depicts an arbitrarily-shaped acoustic power divider formed by an intermediate channel having near-zero compressibility.

FIG. 1 shows an arbitrarily-shaped power divider formed by an intermediate channel 220 having near-zero compressibility (C→0). The material property of the channel 220 results in a quasi-static acoustic field, having uniform acoustic pressure p. When the channels meet matching conditions (i.e., when the total cross-sectional area of the combined output ports' cross-sectional areas is equal or nearly equal to the cross-sectional area of the input port), the input power from input port 211 is completely transmitted and split among the output ports (212, 213, 214, . . . ).

Figure 2:
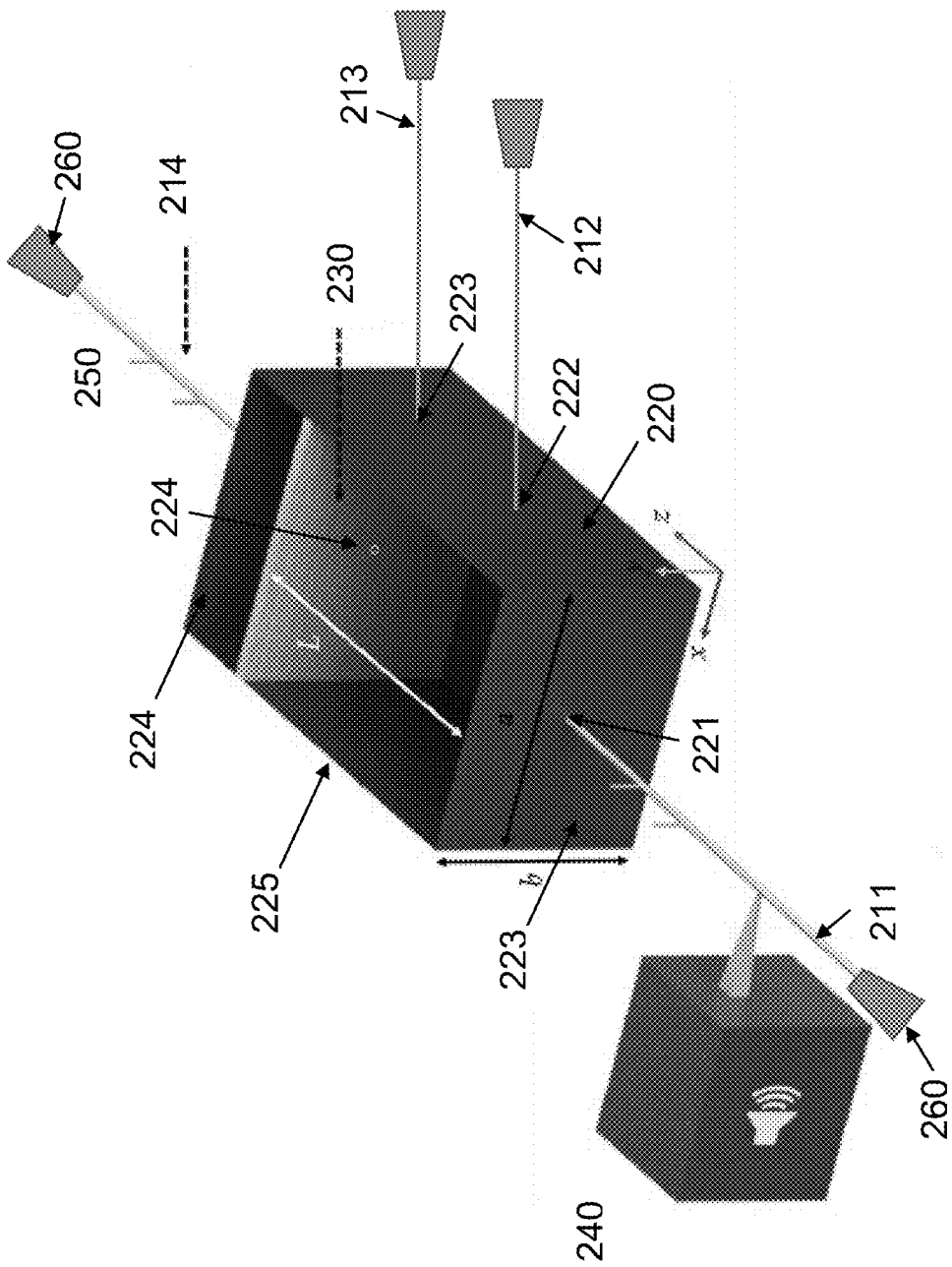
FIG. 2 depicts a CNZ supercoupling power divider in which the input port and output ports are connected by a much wider intermediate channel having variable length

As shown in FIG. 2, the supercoupling power divider apparatus of the invention include an input waveguide 211 and output waveguides 212, 213, 214 that are connected by an intermediate channel 220.

The input and output waveguides 211, 212, 213, 214 are not particularly limited in composition, and may be formed from metals (such as brass, copper, silver, aluminum, mild steel, stainless steel), ceramics (such as alumina), and composite or plastic materials. The waveguides are preferably cylindrical, and have cross-sections defined by a radius r (not shown) and a cross-sectional area $S_1$. For waveguides that are not cylindrical, the determination of cross-sectional area $S_1$ is based on the end shape. The waveguides may be solid or hollow, and in some aspects of the invention, the input waveguide 211 may have a length and cross-sectional area that is the same as the length and cross-sectional area of the output waveguide 212. Preferably the cross-sectional area of the input waveguide 211 and output waveguides 212, 213, 214 is the same.

The input and output waveguides may each include microphone ports 250, and the input waveguide 211 may include an input for a source of acoustic signal 240 (such as an acoustic driver, speaker, horn, or any other source of acoustic input). In some aspects of the invention, the ends of one or both of the input waveguide 211 and output waveguides 212, 213, 214 are covered with an anechoic foam 260.

The input waveguide 211 and output waveguides 212, 213, 214 are in acoustic communication with the intermediate channel 220 via input port 221 and output ports 222, 223, 224, respectively. The input port 221 and output ports 222, 223, 224 preferably have the same cross-sectional shape and area as the ends of the input 211 and output waveguides 212, 213, 214. The intermediate channel 220 may have a variable length L, and may have ends 223, 224 that are rectangular, circular, or elliptical in cross-sectional area $S_2$. Both ends preferably have the same shape and dimensions. In some aspects of the invention, intermediate channels having a rectangular cross-section defined by a width a and a height b are preferred.

In some aspects of the invention, the ends 223, 224 and walls 225 of the intermediate channel 220 are formed using the same material. The channel walls 225 and ends 223, 224 may be formed, for example, using steel, ceramics (such as alumina, silica carbide, tungsten carbide), and other high-stiffness materials. Stiffness of the material may be expressed using Young's modulus (E, measured in GPa), and exemplary values for Young's modulus are provided for reference: $E_{Steel\ (ASTM-A36)}$=200 GPa; $E_{wrougt\ iron}$=190-210 GPa; $E_{SiC}$=450 GPa; $E_{WC}$=450-650 GPa. In some aspects of the invention, it is preferred that the channel walls of the intermediate channel are formed of a material having a Young's modulus (E) that is about 200 GPa or greater. The hard boundary layer minimizes losses due to viscothermal boundary effects. The stiffness of the channel material is correlated to ability to trap the acoustic waves.

In other aspects of the invention, the walls 225 and ends 223, 224 of the channel are formed using different materials. Where the walls 225 and ends 223, 224 of the channel are formed from different materials, preferably the walls 225 of the channel are formed using a material that has an equal or greater stiffness or hardness than the material used to form the ends 223, 224. For example, the ends 223, 224 of the intermediate channel may be formed from wood or a composite material.

Regardless of configuration, the intermediate channels 220 of the invention are preferably filled with a material that has a low stiffness as compared to the channel walls 225. Preferably, the intermediate channel 220 is filled with air. A ZIM or near-ZIM may also be used to form the intermediate channel 220. The intermediate channel 220 of the invention results in creation of first and second resonant modes, where the second resonant mode does not interfere with the first resonant mode. Supercoupling of acoustic signals occurs at the first resonant mode.

The invention incorporates a stiff boundary and a higher-order mode in an intermediate acoustic path having a cross-sectional area $S_2$ that is significantly greater (i.e., at least 16 times greater) than the cross-sectional area $S_1$ of the input port 221. In some aspects of the invention, $S_2$ is at least 25 times greater than $S_1$. Preferably, $S_2$ is at least 50 times greater than $S_1$. More preferably, $S_2$ is at least 100 times greater than $S_1$. This results in a waveguide that excites supercoupling with hard boundary conditions, and achieves supercoupling for various lengths of intermediate channel.

When the cross-sectional area at the input port 221 is equal or nearly equal to the combined cross-sectional areas of output ports 222, 223, 224, the supercoupling power divider apparatus of the invention provide a combined acoustic impedance at the acoustic output ports that matches the acoustic impedance at the acoustic input port. This impedance matching may occur even when the acoustic path extending from the acoustic input port 221 to the acoustic output ports 222, 223, 224 has a variable channel length L. The variation in channel length may be achieved, for example, by providing a movable panel 233 for adjustment the channel length L of the intermediate channel. The movable panel 233 may have an input waveguide 211 or output waveguide 212, 213, 214 fixed thereto.

The power dividers of the invention achieve compressibility-near-zero (CNZ) acoustic supercoupling, in which all or almost all power is transferred with a uniform phase from the input port to the output port. The supercoupling power dividers of the invention may be hollow (e.g., filled with air), or may incorporate a ZIM or near-ZIM. The supercoupling power dividers have a first resonant mode, and excite a higher-order mode at cut-off, which provides an experimentally viable, simple geometry demonstrating effective compressibility near zero and supercoupling for sound. The second, higher-order resonant mode does not interfere with the first resonant mode. In some aspects of the invention, the power dividers operate at a frequency of about 20 kHz or less.

The use of boundary materials that exhibit significantly greater stiffness than the power divider media permits excitation of a higher-order mode, which may synthesize effective soft boundary channels that support a cut-off at finite frequency and therefore enable acoustic tunneling phenomenon. The boundary minimizes signal losses due to viscothermal boundary effects. This approach establishes new pathways for extreme acoustic metamaterials, cloaking, acoustic sensing, and wave patterning.

The acoustic input signals from the source of signal 240 may be characterized based on a variety of features, such as impedance Z, power P, pressure p, and sound intensity J. Relationships among these variables may be calculated using constants that include the speed of sound waves in transmission medium c, and density of transmission medium $\rho$.

Further features of the supercoupling power dividers of the invention include the ability to tune the amount of power at each output port (e.g., by adjusting the relative cross-sectional areas of the output ports) and scale the length L and height b of the coupling channel while maintaining the CNZ tunneling condition.

The amount of power delivered to each of the two or more output waveguides can be adjusted by altering the relative cross-sectional areas of the two or more output ports. For example, if each of four output ports has the same cross-sectional area, then the power delivered to each output waveguide will be approximately equal (i.e., about ¼ of the power at the input port). If a first output port has a cross-sectional area that is half the cross-sectional area of the input port, and two further output ports have cross-sectional areas that are each one fourth of the cross-sectional area of the input port, then the power delivered to the first output port will be about half of the power at the input port, and the power delivered to each of the two further output ports will be about a fourth of the power at the input port.

The N-port series supercoupling power dividers of the invention provides further unique features, such as operation with an arbitrary number of ports for equal amplitude and equal phase power division, independent of the placement of the ports along the central region of the channel. Additionally, the power dividers can maintain their functionality, independent of changes in the length and height of the coupling channel, given that there is a significant difference between the cross-sectional areas of the input/output waveguides and the cross-sectional area of the coupling channel. The intermediate channel has a cross-sectional area $S_2$ that is significantly greater (i.e., at least 16 times greater) than the cross-sectional area $S_1$ of the input waveguide port. In some aspects of the invention, $S_2$ is at least 25 times greater than $S_1$. Preferably, $S_2$ is at least 50 times greater than $S_1$. More preferably, $S_2$ is at least 100 times greater than $S_1$. This results in a power divider that excites supercoupling with hard boundary conditions, and achieves supercoupling for various lengths of intermediate channel.

By designing the acoustic channel to support a compressibility-near-zero (CNZ) condition with hard boundary conditions in a higher-order mode, it is also possible to invert the phase (by radians) at an arbitrary number of output ports without compromising impedance matching in the device. This approach overcomes limitations of traditional meander-line-based series power dividers, which require the output ports to be constrained to specific locations along the length of the component.

Figure 6A:
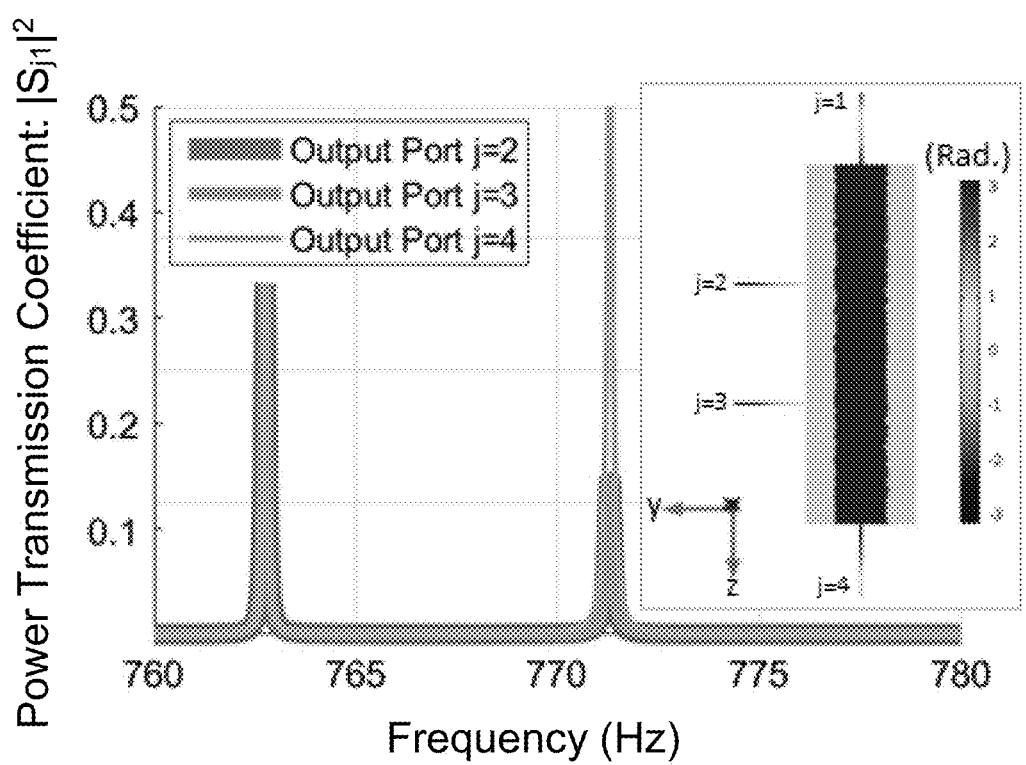
FIG. 6A shows a power divider in which two output ports are placed along the side of the intermediate channel, and a third output port is placed at the end.
Figure 7A:
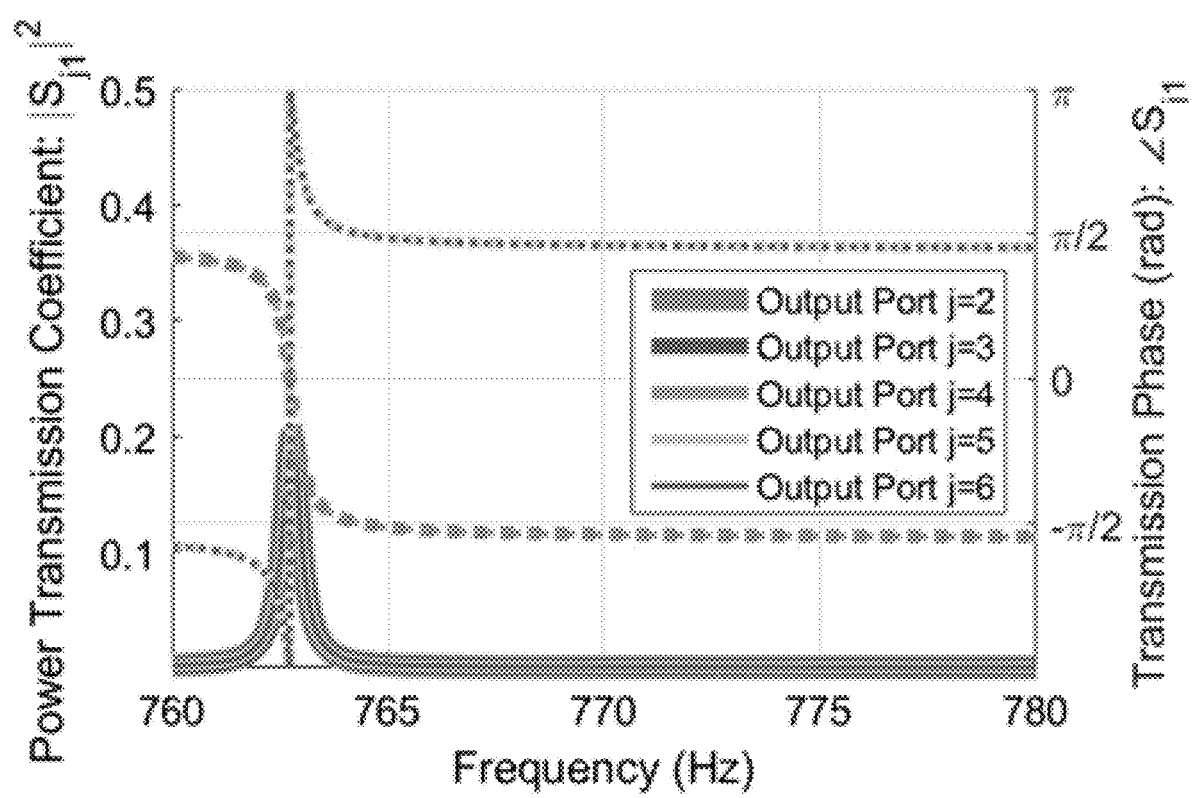
FIG. 7A shows a uniform-phase acoustic power divider, in which the height and length of the channel are varied, and there are a total of 5 output ports (one on each opposing face of the intermediate channel).
Figure 8A:
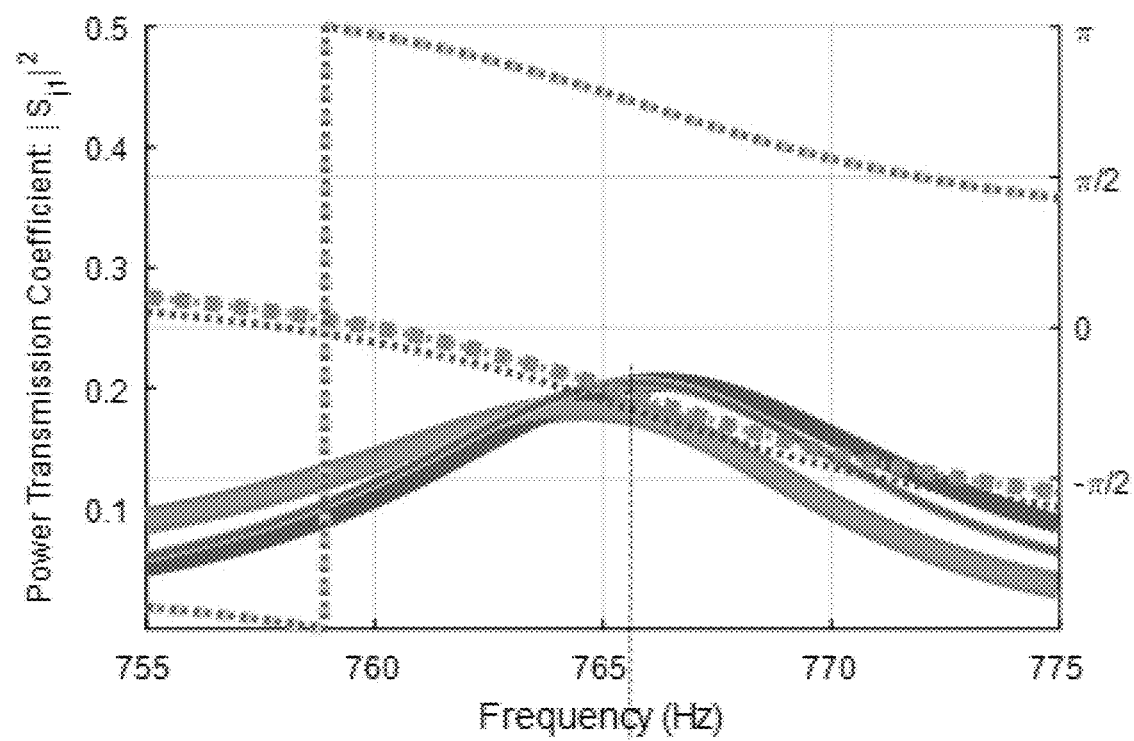
FIGS. 8A-D depict the scaling limitations for the acoustic power divider.

The acoustic supercoupling power dividers of the invention may be configured to divide the signal with a phase flip of $\pi$ radians, alongside the equi-phase output ports, as illustrated in FIGS. 6A, 7A, and 8A. In this aspect of the invention, output ports provided within $\lambda/4$ of the center of the acoustic channel have a uniform phase, while output ports placed more than $\lambda/4$ from the center of the acoustic channel have a phase that is flipped by 180 degrees.

Acoustic media that support near-zero-index propagation, in which the effective compressibility of a waveguide channel approaches zero, allow the complete tunneling of acoustic waves with nearly infinite wavelength (or equivalently, uniform phase). These properties provide for the supercoupling acoustic power dividers of the invention, which permit the tunneling of acoustic power to an arbitrary number of output ports, where the phase shift with respect to the input signal can be selected to be either 0 or 180 degrees.

In the absence of material loss and radiation loss, the invention permits input ports to fully couple their incident power to an arbitrary number of output channels. Moreover, an additional capability of the uniform phase power divider is the ability to tune the amount of power to each port while maintaining impedance matching in the system. By evaluating the trade-offs between visco-thermal loss, radiation loss, phase uniformity, and power splitting, a practical avenue towards more compact and lower-loss CNZ supercoupling is provided. This opens possibilities for new small (e.g., centimeter) scale acoustic supercoupling devices with potential applications in wave shaping, sensing, filtering, and interferometry.

Devices and Methods.

The supercoupling power dividers of the invention may be incorporated into small-scale (i.e., centimeter scale) acoustic supercoupling devices. These devices may include sensors, such as microelectromechanical (MEMS) sensors. The sensors may be used, for example, to create accelerometers, optical sensors, and Fabry-Perot interferometers (e.g., laser resonance type).

Methods of making the supercoupling waveguides and supercoupling power dividers are also provided.

The supercoupling waveguides and supercoupling power dividers of the invention may be used in methods for dividing power evenly.

In some aspects of the invention, methods are provided for achieving supercoupling in an acoustic path. The methods include providing an acoustic path having an air-filled channel and a boundary layer formed from a material having a Young's modulus (E) that is about 200 GPa or greater. The acoustic path has an acoustic input port and at least two acoustic output ports. An acoustic signal is then provided through the input port (optionally via an input waveguide in acoustic communication with the input port), which is transmitted through the acoustic path to the at least two acoustic output ports.

In order to achieve supercoupling, the cross-sectional area of the acoustic input port is equal to the combined cross-sectional areas of the at least two acoustic output ports. When supercoupling is achieved in the acoustic path, the combined signals at the at least two acoustic output ports have an impedance equal to the impedance of the signal at the acoustic input port.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1. Acoustic Power Divider with Equi-Phase Power Division

In a near-zero-index material, it can be shown that the governing wave equations will be temporally and spatially decoupled [Ziolkowski, R. W., Propagation in and scattering from a matched metamaterial having a zero index of refraction. *Phys. Rev. E* 70, 046608 (2004).]. For acoustic phenomena, this results in a pressure field that is uniform throughout the medium, therefore if the signal is sampled from such a medium the output signals are expected to have equal phase. To demonstrate this theoretically, let us consider the following scenario where several input/output channels are connected to an intermediate medium with near-zero-index properties, as shown in FIG. 1.

In this case, the effective compressibility, $C_{eff}$, is assumed to be zero and thus $$\lambda = \frac{1}{f}\sqrt{\frac{1}{C_{eff}\rho_{eff}}} \to \infty.$$

Channel #1 (with characteristic acoustic impedance $Z_1$) is the input and the other channels (with characteristic acoustic impedance $Z_1$) are dedicated for the output. $Z_j$ is defined as $$Z_j = \frac{\rho_j c_j}{S_j},$$

where $j \in [2, N]$ is the index of each output channel and $\rho_j$, $c_j$ and $S_j$ are respectively the mass density, sound velocity, and cross sectional area of the channel j.

As the pressure in the intermediate medium is constant, the pressure boundary condition is $$p_{i1}^+ + p_{i1}^- = p_{t2} = p_{t3} = \ldots = p_{tN} \quad (1)$$

Which can be simplified and written as, $$1 + R_1 = T_2 = \ldots = T_N \quad (2)$$

Where $R_1$ and $T_x$ $x \in [2,N]$ are the reflection and transmission coefficient of the input and output channels respectively.

By applying the particle velocity boundary condition, the volume velocity q reads:

$$q_{i1}^+ + q_{i1}^- = q_{t2} + q_{t3} + \ldots + q_{tN} \quad (3)$$

And, assuming plane wave propagation in the input/output waveguides, it can be expressed in terms of pressure as, $$\frac{p_{i1}^+}{Z_1} - \frac{p_{i1}^-}{Z_1} = \frac{p_{t2}}{Z_2} + \frac{p_{t3}}{Z_3} + \ldots + \frac{p_{tN}}{Z_N} \quad (4)$$

This relation can be simplified as, $$1 - R_1 = Z_1\left(\frac{T_2}{Z_2} + \frac{T_3}{Z_3} + \ldots + \frac{T_N}{Z_N}\right) \quad (5)$$

By substituting Eq. (2) into Eq. (5), the reflection and transmission coefficient of the input and output channels are derived and expressed respectively by, $$R_1 = \frac{Z_1^{-1} - \sum_{j=2}^{N} Z_j^{-1}}{\sum_{j=1}^{N} Z_j^{-1}} \quad (6)$$

$$T_x = 1 + R_1 = \frac{2Z_1^{-1}}{\sum_{j=1}^{N} Z_j^{-1}}, x \in [2, N] \quad (7)$$

Where the power transmission and reflection coefficients are defined by $$T_{\Pi x} = \frac{Z_1}{Z_x}|T_x|^2$$

and $R_{\Pi 1} = |R_1|^2$, respectively. It is clear that for a two-port structure, where $Z_1 = Z_2$, that no signal is reflected back into the input while all of the energy is tunneled through the intermediate medium into the output. Now let us consider the condition where the characteristic acoustic impedance of the input/output channels are all the same ($Z_1 = Z_2 = \ldots = Z_N$), which results in the following expressions for the reflection and transmission coefficients for amplitude and power:

$$R_1 = \frac{2}{N} - 1, R_{\Pi 1} = \frac{4}{N^2} - \frac{4}{N} + 1 \quad (8)$$

$$T_x = \frac{2}{N}, T_{\Pi x} = \frac{4}{N^2} \quad (9)$$

Where N is the total number of ports in the power divider ($N \geq 2$). The relations of Eq. (8) and (9) reveal that:

(1) If the number of the output channels is increased, the amount of the reflected power will rise.

(2) The amount of the transmitted power is inversely proportional to the square of the number of the output ports.

(3) If the number of the output ports is limited to 1 or (N=2) then the tunneling condition arises with $T_2 = 1$, $R_1 = 0$.

Example 2. Acoustic Power Divider with Equi-Phase Zero-Reflection Power Division Moreover, an analysis of Eq. (6) and Eq. (7) reveals that, when the number of the output ports is greater than one, the reflected power can be suppressed if:

$$Z_1^{-1} = \sum_{j=2}^{N} Z_j^{-1} \quad (10)$$

Hence, as far as the aforementioned relation is satisfied, the input power can be divided between the output ports with equal phase and without reflection, irrespective of the distribution of the acoustic characteristic impedance of the output ports, while only putting a constraint on their sum.

Example 3. Acoustic Power Divider with Equi-Phase and Equi-Amplitude Zero-Reflection Power Division Furthermore, the output power can be evenly divided among the ports if the characteristic impedance of each output port ($Z_j$) is equal. To theoretically demonstrate this, Eq. (10) can be further expanded using the material properties as well as geometrical dimensions of the channel, as $$\frac{S_1}{\rho_1 c_1} = \frac{S_2}{\rho_2 c_2} + \frac{S_3}{\rho_3 c_3} + \ldots + \frac{S_N}{\rho_N c_N} \quad (11)$$

If the material inside the input and output channels are chosen to be the same, or in other words the specific acoustic impedances of the channels were equal, then the aforementioned relation is simplified in the following form $$S_1 = S_2 + S_3 + \ldots + S_N \quad (12)$$

This relation reveals a matching condition for the CNZ power divider which will completely suppress the reflected power from the input. For this to happen, the sum of the cross-sectional areas of the output channels should be equal to the cross-sectional area of the input channel (when the materials in the input and output channels are identical).

Example 4. Numerical Simulations

Now let us turn to the realization of such a CNZ power divider. Previously, it was shown that it is possible to achieve an effective compressibility near-zero medium by exciting a hard-walled acoustic waveguide with a rectangular cross section at exactly the cutoff frequency of its (2,0) mode. Moreover, it was shown that in order to achieve good impedance matching, the ratio of the cross-sectional areas of the input/output waveguides to the intermediate tunneling channel should be very small. This constraint can be expressed as $$S_j << S_{ch}, \forall j \in [1, N] \quad (13)$$

where $S_{ch}$ is the cross-sectional area of the intermediate channel that will exhibit CNZ properties and N is the total number of waveguides connected to the intermediate channel. Following these principles, a finite element model was constructed in Comsol Multiphysics, employing the Pressure Acoustics module and frequency domain solver. Air was chosen from the Comsol built-in material list as the filling fluid of all structures. Finally, the input and output ports were set to Plane Wave Radiation conditions while the acoustic source was modeled as an Incident Pressure Field at the input port. Sound hard boundary conditions were used to model the walls of the input/output waveguides as well as the intermediate channel. Parameters for FIGS. 3A-3C, 4A-4D, 5A-5D, and 6A-6B were chosen such that the CNZ channel had dimensions of a=0.450 m, b=0.382 m, and L=0.79 m. Results are shown in FIGS. 3A-3C and FIGS. 4A-4D, where the described system was operated with three output ports, following the constraints of Eq. (9) and Eq. (12) in each figure, respectively.

Example 5. Considering the Lossless Case

Figure 3A:
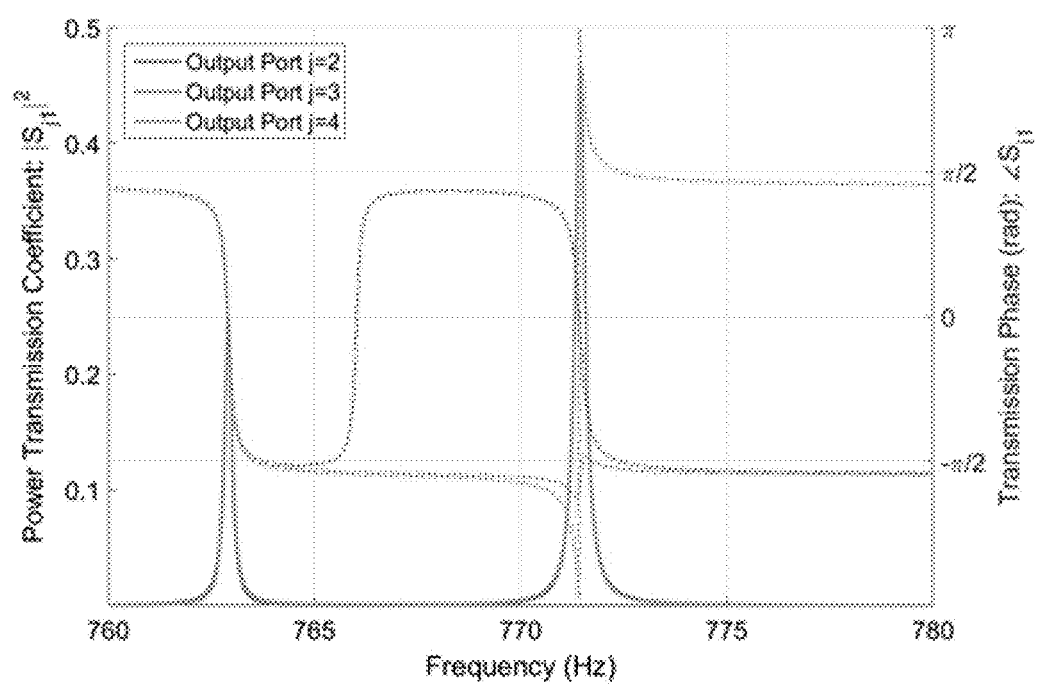
FIGS. 3A-3B are graphs showing that equal cross-sectional areas of the output waveguides result in equal distribution of output power.
Figure 3B:
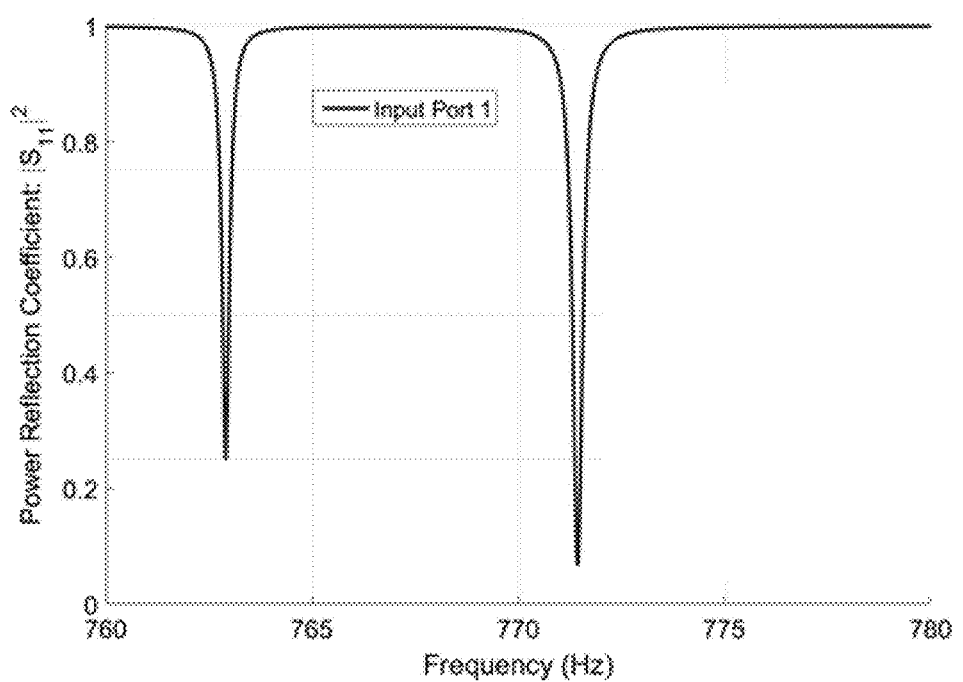
Figure 3C:
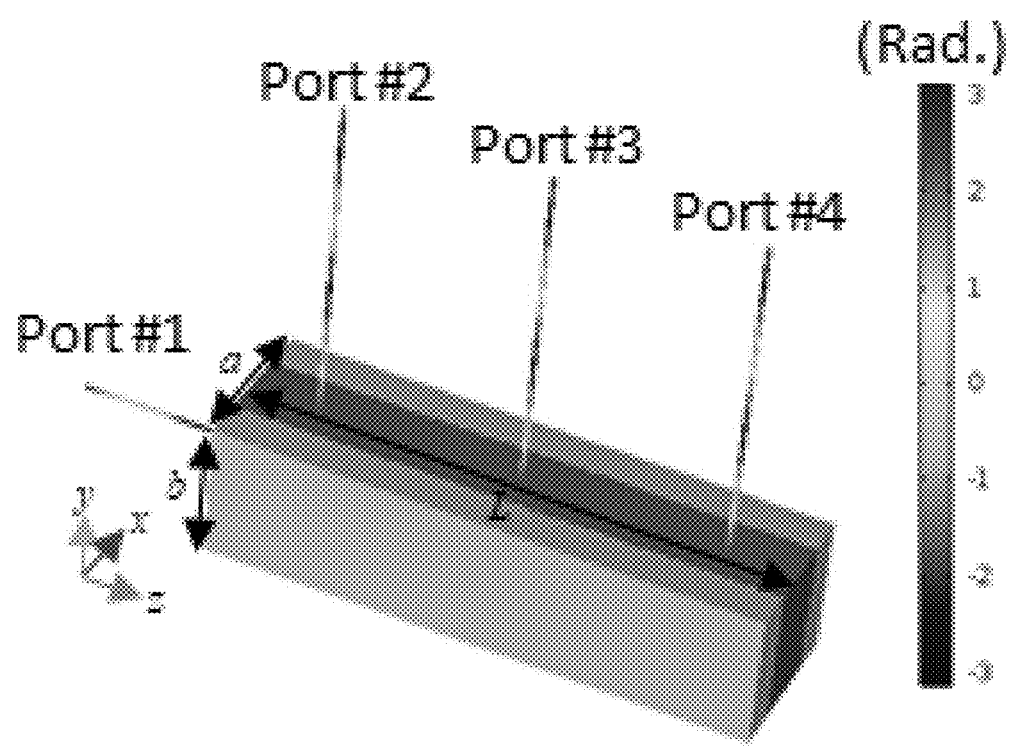
FIG. 3C shows that there is nonzero reflection at the input port (which has the same cross-sectional area as each of the output waveguides) and therefore not all of the power is transmitted.

FIGS. 3A-3B show the geometrical configuration and phase distribution of the uniform-phase equal-amplitude acoustic power divider in FIG. 3C. The system is composed of hard-walled cylindrical waveguides for the input (port #1) and outputs (port #2-4), connected to an intermediate hard-walled channel with rectangular cross section. In this configuration, all input/output waveguides are filled with air. The output ports are placed at the top-center of the channel, where the phase of the CNZ resonance is uniform and equal to the input phase. Operated at its second cut-off frequency, the intermediate channel performs as an effective CNZ medium and results in uniform-phase output signals. Moreover, equal cross-sectional areas of the output waveguides results in equal distribution of output power among them (FIG. 3A). The power transmission coefficient and phase show that the power is divided evenly ($|S_{j1}|^2 = 0.25$ where $j \in [2,4]$) with equal phase among three output ports at the CNZ frequency of 763 Hz. However, as shown in FIG. 3B, there is a reflection of the incident energy, such that 25% of the power is reflected back, in agreement with Eq. (8) and Eq. (9). The power reflection coefficient reveals nonzero reflection at the input port ($|S_{11}|^2 = 0.25$ at 763 Hz). The dimensions of the CNZ channel are a=0.450 m, b=0.382 m, and L=1.5 m. The radius of the input/output channels are $r_i = r_o = 6.3$ mm.

Figure 4A:
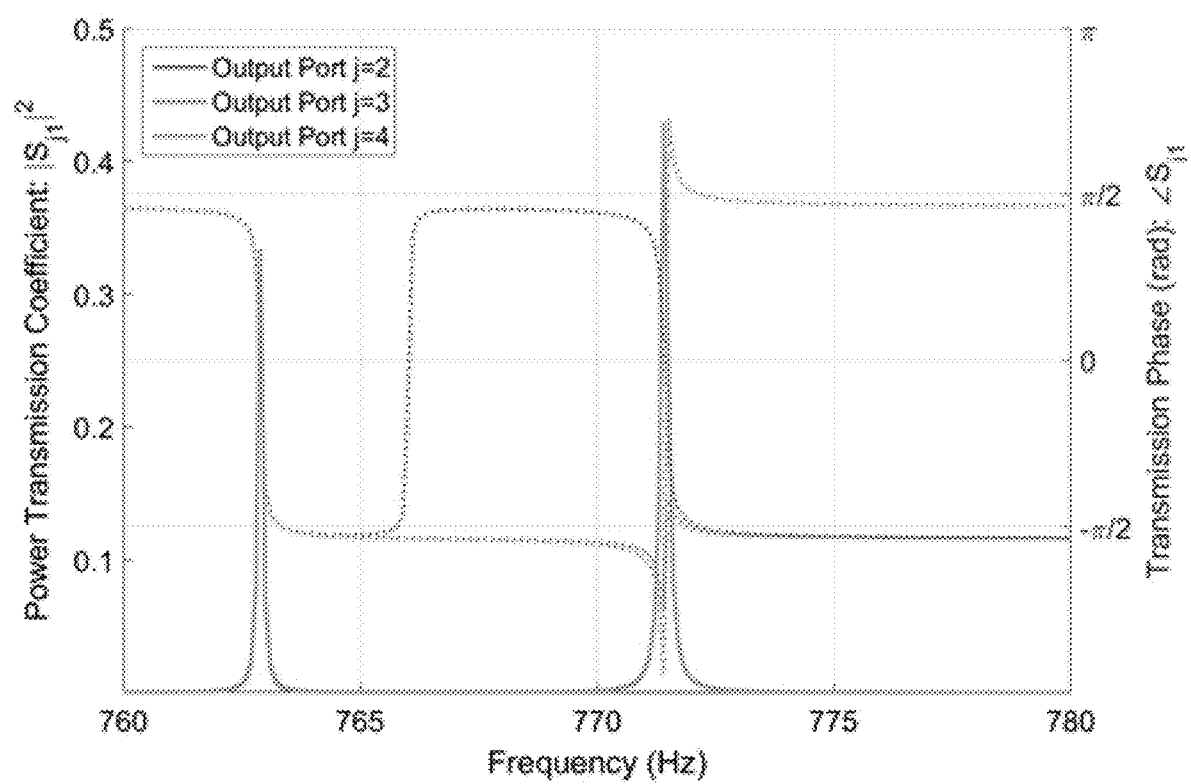
FIGS. 4A-4D show the power divider of FIGS. 3A-3C, in which all of the dimensions and materials are kept constant, but the cross-sectional area of the input waveguide is equal to the sum of the cross-sectional areas of the output waveguides.
Figure 4B:
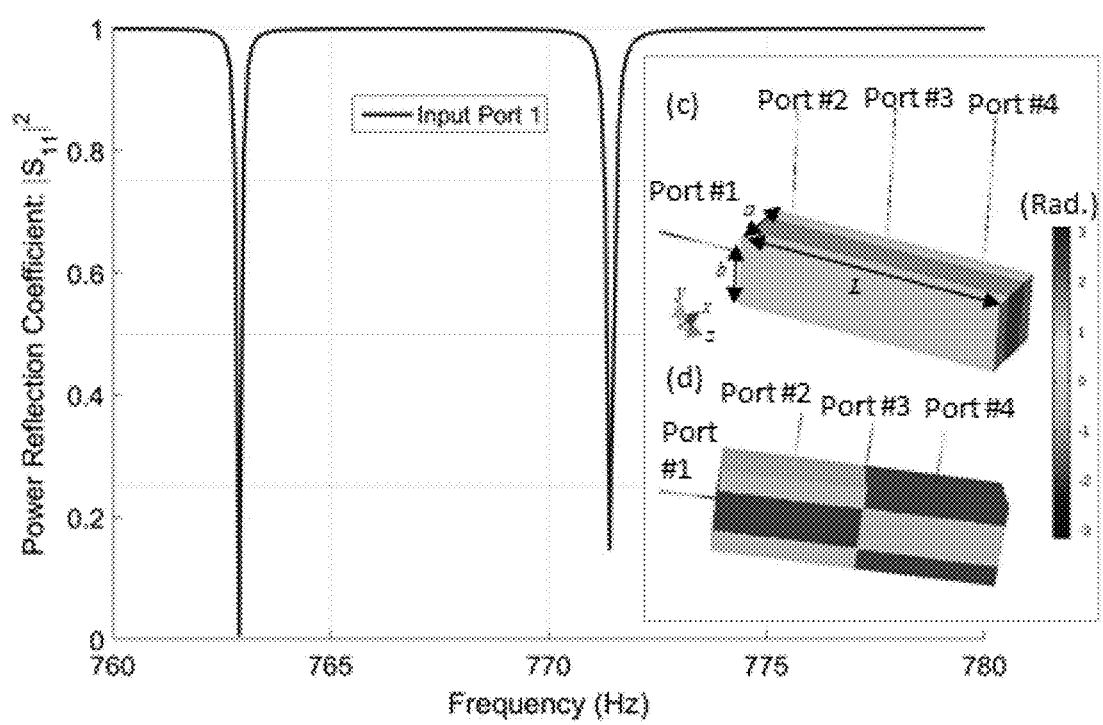
Figure 4C:
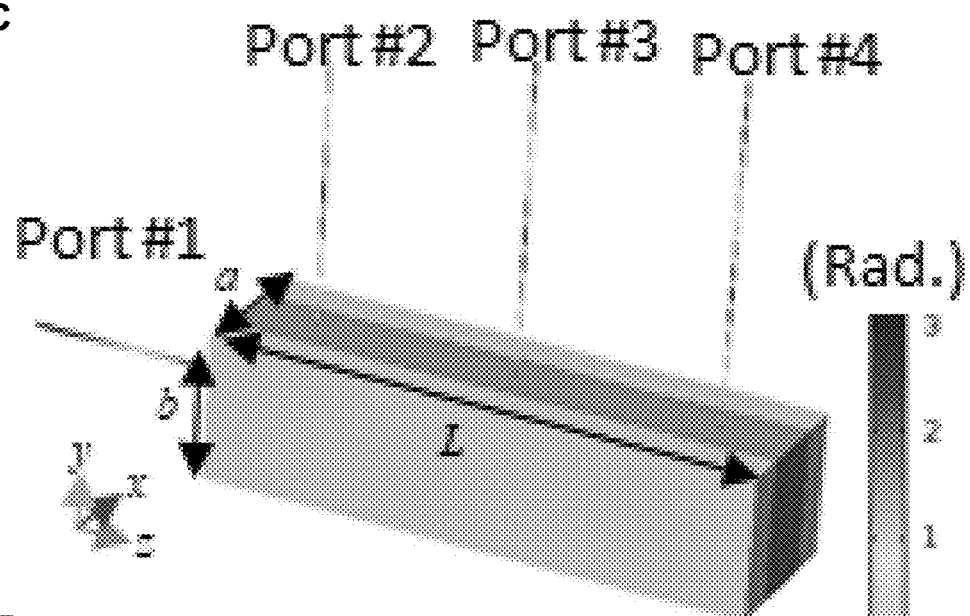
Figure 4D:
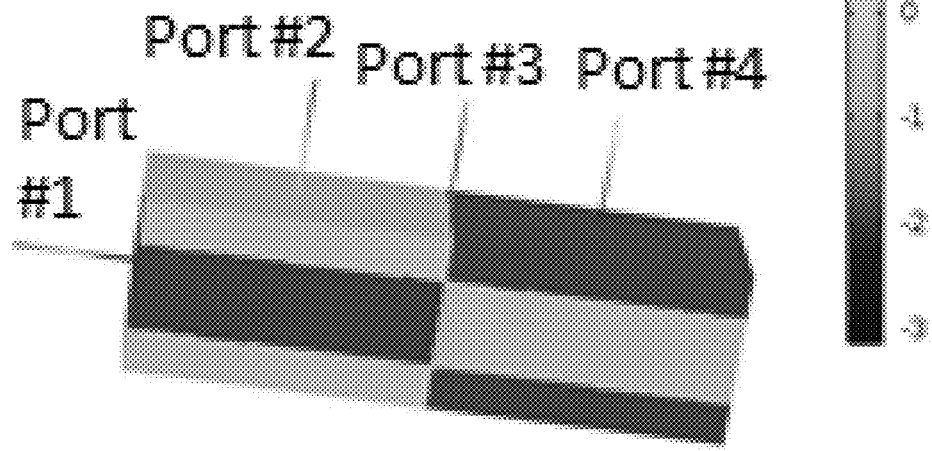

In order to suppress the reflected power and couple all of the input energy to the output of the system, a second configuration was constructed following the conditions of Eq. (12), and this is shown in FIGS. 4A-4D. FIGS. 4A-4D show the power divider of FIGS. 3A-3C, in which all of the dimensions and materials are kept constant, but the cross-sectional area of the input waveguide is equal to the sum of the cross-sectional areas of the output waveguides ($r_i = 6.3$ mm, $r_o = 6.3/\sqrt{3}$ mm), which are each smaller by a factor of three. By examining this figure, it can be verified that there is impedance matching at the CNZ frequency and therefore full power transmission of the input signal with zero reflection at the input, while the power is split evenly among the three output channels with equal phase, as expected from Eq. (10). As shown in FIG. 4A, the input signal is split evenly ($|S_{j1}|^2 = 0.\overline{3}$) and with the same phase among the three output ports at the CNZ frequency of 763 Hz. FIG. 4B shows that the reflected power at the CNZ frequency has now been completely suppressed due to the matching condition, as dictated by Eq. (12). In FIG. 4C, spatial phase distribution at the CNZ frequency is shown, illustrating the uniformity of the phase of the delivered output signals and the geometrical parameters. FIG. 4D shows the spatial phase distribution for the higher-order mode at 773 Hz.

The CNZ mode profile represents a standing wave in the x-direction of FIGS. 3A-3C, where the frequency of the mode depends upon the width of the intermediate channel, a, and is independent of the length, L, and the height, b (given that Eq. (13) is also satisfied). This result is in contrast with that of the higher-order resonance (the second peak in FIGS. 3A-3C and FIGS. 4A-4D) which depends upon the length of the channel, analogous to the Fabry-Perot resonances observed in electromagnetics. The phase distribution of this higher-order mode is not uniform along the channel length (see FIG. 4D), and therefore does not provide power equally to all ports.

Figure 5A:
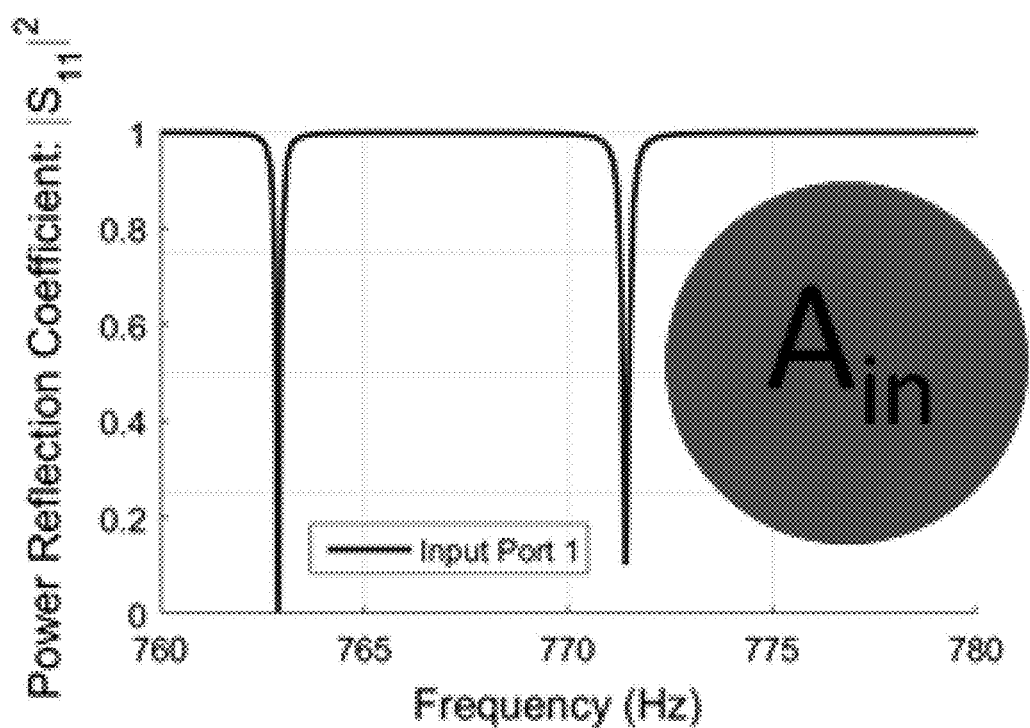
FIGS. 5A-5D are graphs depicting the matching condition for the input/output waveguide cross-sectional areas in the power divider, in which the outputs have unequal cross-sectional areas.
Figure 5B:
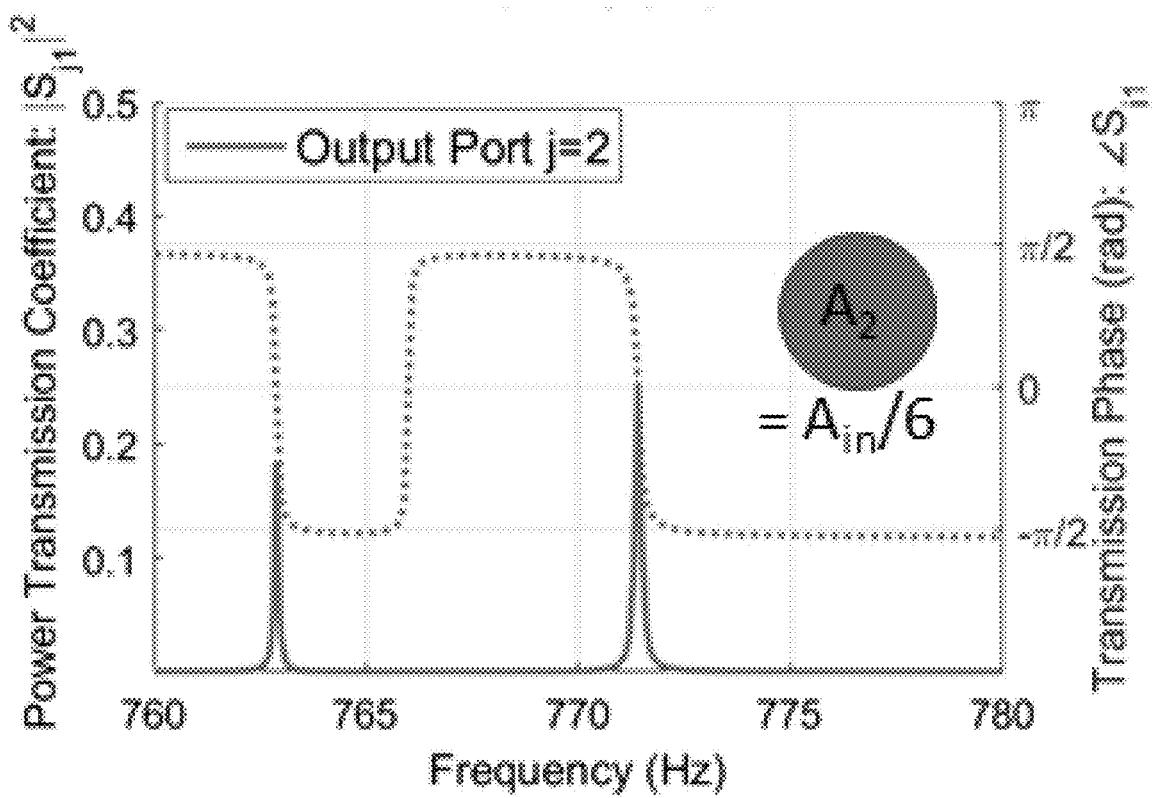
Figure 5C:
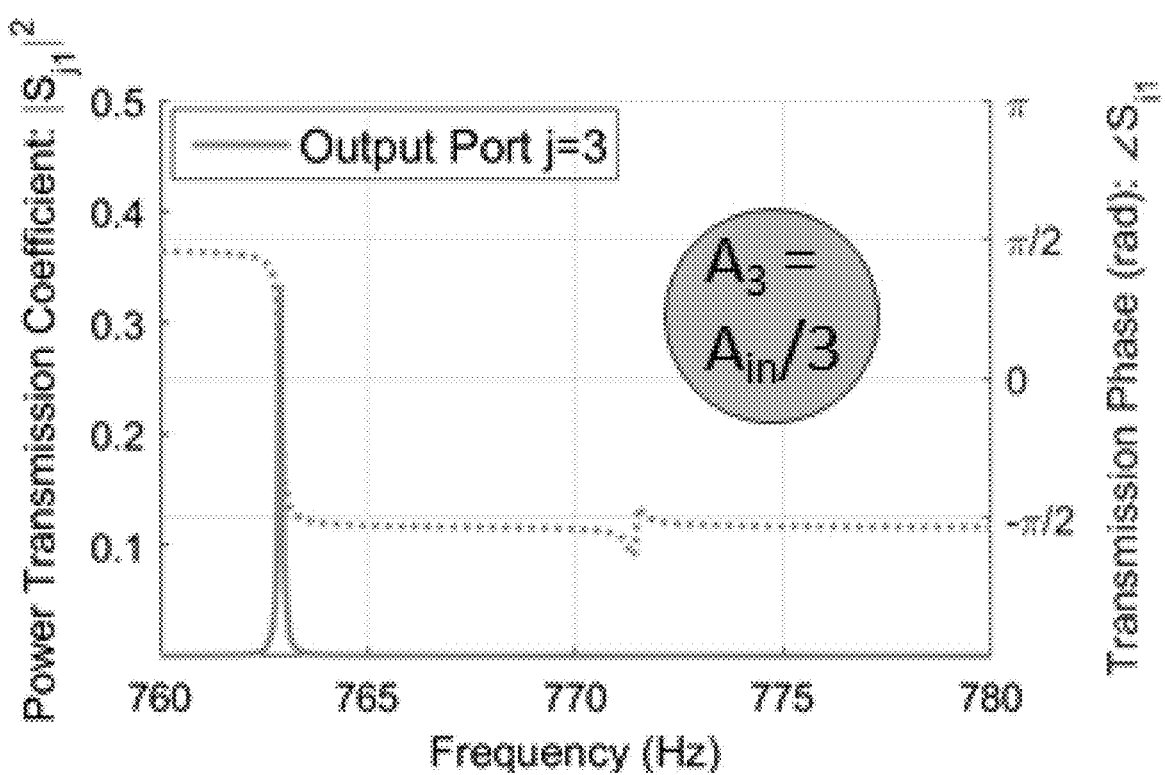
Figure 5D:
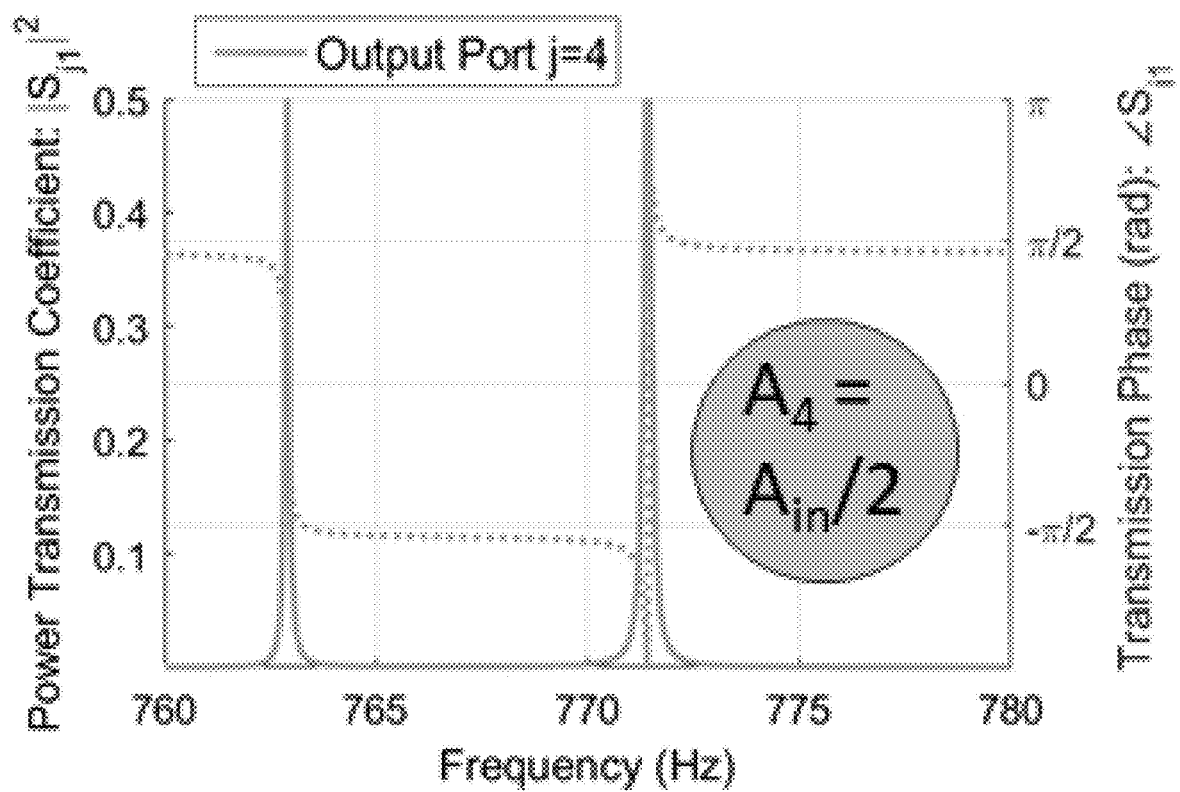

Furthermore, it should be noted that the matching condition of Eq. (12) does not require all output ports to have the same cross-sectional area. When this condition is met with unequal cross sectional areas at each output, this allows zero reflection at the input, as well as control over the power distribution can to each of the output ports, as shown in FIGS. 5A-5D. In this case, the geometrical and material parameters were kept constant with respect to FIGS. 4A-4D, except that $r_i = 6.3$ mm, $r_{o2} = 6.3/\sqrt{6}$ mm, $r_{o3} = 6.3/\sqrt{3}$ mm, $r_{o4} = 6.3/\sqrt{2}$ mm, meaning that the cross-sectional areas of the outputs were set to $S_2 = S_{1/6}$, $S_3 = S_{1/3}$, and $S_4 = S_{1/2}$, such that $S_1 = S_2 + S_3 + S_4$ and Eq. (12) is satisfied. This resulted in an impedance-matched power divider, where no reflection is seen at the input, but where the amount of power distributed to each output is equally proportional to $S_j/S_1$, such that $P_2 = P_{in}/6$, $P_3 = P_{in}/3$, and $P_4 = P_{in}/2$. The tuning of output power can prove useful in some applications, such as making interferometric measurements of a lossy sample, where there are two output channels: one being an empty reference channel (without material loss), and a second being filled with some lossy material. By increasing the output power to the sample's channel, the system can be designed to compensate for the material loss and compare the phase of two signals having equal power. As shown in FIG. 5A, as the matching condition of Eq. (12) is satisfied, the reflected power remains zero at the CNZ frequency of 763 Hz. FIG. 5B shows that the cross-sectional area of the second output port is $A_2=A_{in}/6$ and the output power is $|S_{21}|^2=\frac{1}{6}$. FIG. 5C shows that the cross-sectional area of the third output port is $A_3=A_{in}/3$ and the output power is $|S_{31}|^2=\frac{1}{3}$. FIG. 5D shows that the cross-sectional area of the fourth output port is $A_4=A_{in}/2$ and the output power is $|S_{41}|^2=\frac{1}{2}$.

Figure 6B:
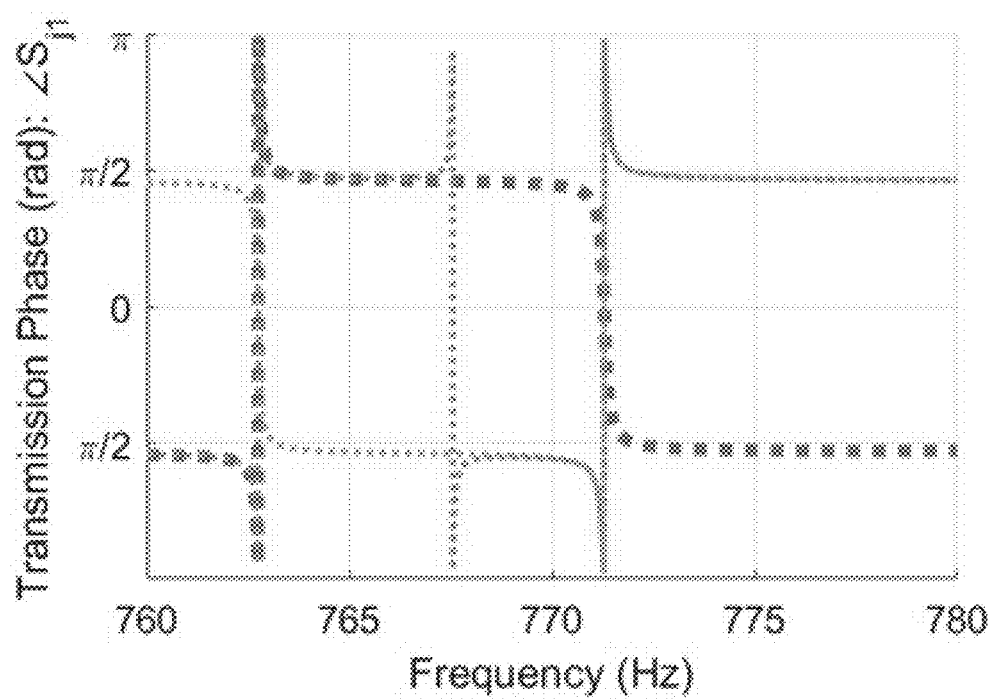
FIG. 6B shows that power is evenly divided among the three output channels at the CNZ frequency of 763 Hz.

Another unique feature of the proposed configuration is that the phase of the (2,0) mode within the channel is flipped by 180 degrees near the boundaries on the sides of the channel, (see FIGS. 6A-6B). In this case, all geometrical and material parameters are the same as FIGS. 4A-4B, except for the locations of the output waveguides, which are placed with output ports 2 and 3 along the side of the intermediate channel, while port 4 is placed at the end (see spatial phase profile, top-right inset). It can be seen that power is evenly divided among the three output channels at the CNZ frequency of 763 HZ, and that impedance matching, and thus full power transmission, is still achieved (FIG. 6A), when the output ports are installed transverse to one another. More importantly, as shown in FIG. 6B, the signal that is coupled to the side channels (output ports 2 and 3) is the phase inverted (180-degree phase-flipped) version of the output signal along the end face (output port 4, phase is 0 degrees). FIGS. 6A-6B also highlight the capability of inverting the phase of some output channels, while preserving the input phase of one (or more) channel(s).

Figure 7B:
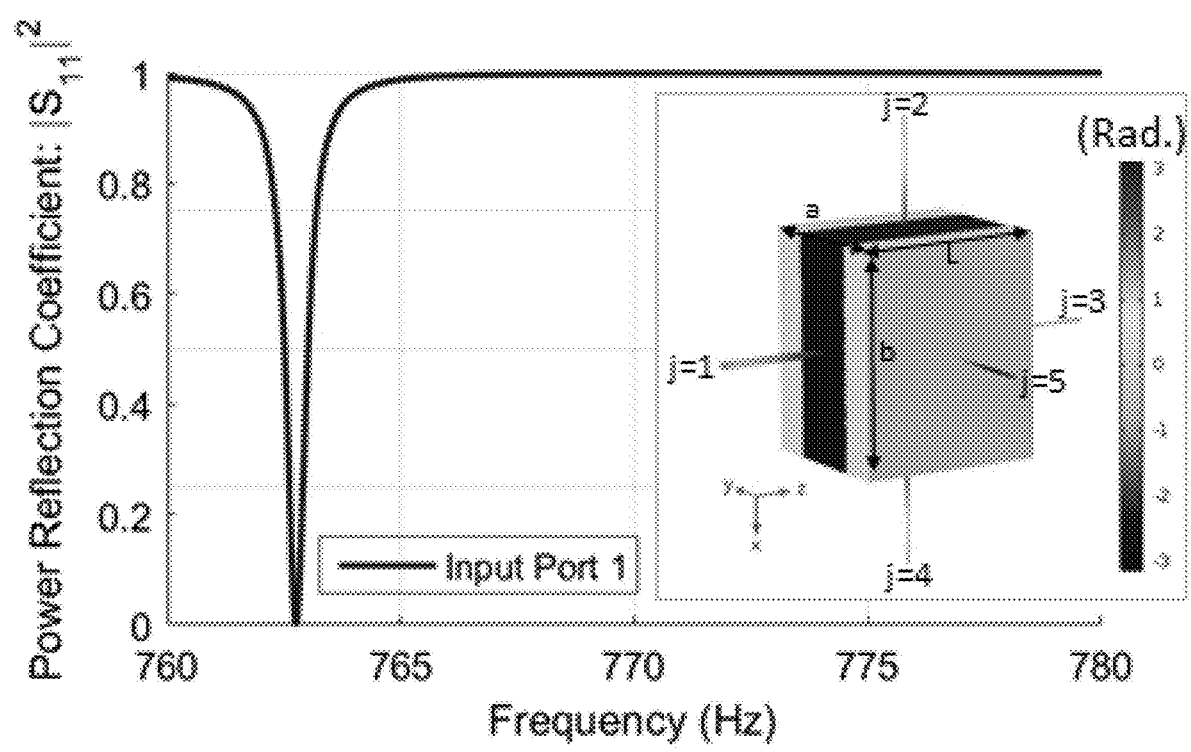
FIG. 7B is a graph showing that power is divided evenly among the 5 output ports at the CNZ frequency of 763 Hz. The phase is 0° at the CNZ frequency for ports 2, 3, and 4, and the phase is 180° for ports 5 and 6.

As previously discussed, CNZ-based series power dividers are also expected to have invariant performance with changes in the length and height of the coupling channel. To demonstrate this, a more general case of the power divider is shown in FIGS. 7A-7B, where both the length and height are changed with respect to the previous figures; additionally, the number of output ports is increased to five, and output ports are placed along all faces of the intermediate channel (except for the input face).

In this case, the cross-sectional area of the input port is the same as in FIGS. 3A-3C, 4A-4D, 5A-5D, and 6A-6B, however the cross-sections of all output ports are now equal to $S_{in}/5$, in order to satisfy Eq. (12). The power divider maintains uniform phase for any port placed within $\lambda/4$ of the center of the channel and the output phase flips by 180 degrees for any output waveguide that is placed elsewhere (see inset-bottom). As shown in FIG. 7A, power is divided evenly among the 5 output ports at the CNZ frequency of 763 Hz. The phase is zero at the CNZ frequency for ports 2, 3, and 4, and the phase is 180 degrees for ports 5 and 6. FIG. 7B shows that the reflected power remains zero at the CNZ frequency. The dimensions are a=0.450 m, b=0.6 m, L=0.5 m, $r_i$=6.3 mm, and $r_o$=6.3/$\sqrt{5}$ mm.

Example 6. Modeling Losses Due to a Finite Boundary Thickness and Scaling the Dimensions Finally, a study was carried out to assess the scalability of the uniform-phase acoustic power divider. In particular, downscaling the device is emphasized because it could enable a less bulky package that would be easier to fit in a finite-sized acoustic system. Additionally, shrinking the dimensions might permit significantly lower radiation losses than those observed experimentally. This can occur because a smaller channel would require a higher frequency for the excitation of the CNZ mode, which corresponds to a shorter wavelength in the transverse direction within the channel (where $\lambda$ is not infinite).

To further understand this concept, the radiation loss in the intermediate channel due to finite thickness (i.e. l=1.5 mm) of an approximately sound-hard wall (i.e. steel) can be approximated by characterizing the channel as a resonant cavity having a total quality factor which depends upon both a loaded and unloaded quality factor, $$\frac{1}{Q} = \frac{1}{Q_{loaded}} + \frac{1}{Q_{unloaded}}.$$

In this case, the loaded quality factor represents the case when the channel is attached to the output waveguides (which act as the load), but has perfect hard boundaries (there is not any radiation). Then, it follows that the unloaded quality factor represents the case when the output ports are blocked (in other words, the load is removed) and the boundaries allow for radiation. The former case has already been modeled in numerical results from FIGS. 3A-3C to FIGS. 7A-7B, where the channel has $$Q_{loaded} \equiv \frac{f_r}{\Delta f} \approx 7500.$$

This value can change depending upon the length, height, and number of output ports, however $Q_{loaded} \approx 7500$ will be used as an estimate in this example.

To find an expression for $$Q_{unloaded} \equiv 2\pi \frac{W_{stored}}{W_{rad}}$$

(where $W_{stored}$ is the steady-state energy stored in the cavity in one period and $W_{rad}$ is the energy radiated in one period), the power lost from each transient reflection can be approximated by using the power transmission coefficient through an acoustic slab with finite thickness, l, at normal incidence:

$$T = \frac{4}{4\cos^2(k_{steel}l) + \left(\frac{Z_{steel}}{Z_{air}} + \frac{Z_{air}}{Z_{steel}}\right)^2 \sin^2(k_{steel}l)} \quad (14)$$

The normal incidence assumption is justified because the monomodal (2,0) mode in the cavity resonates in a direction that is normal to two of the boundaries (from which nearly all of the radiation occurs). Then a standing wave in the resonator with power $$\frac{|a|^2}{2Z_{air}}$$

will lose an amount of power $$T\frac{|a|^2}{2Z_{air}}$$

at the first transient reflection and it will lose $$T(1-T)\frac{|a|^2}{2Z_{air}}$$

at the second transient reflection. If $(1-T) \approx 1$ (for example, for the intermediate channel of FIGS. 2-6, $T \approx 2.25 \cdot 10^{-4}$) then a power of $$T\frac{|a|^2}{2Z_{air}}$$

is radiated after each reflection with a total of two reflections per period. This results in a radiated power per cycle of $$P_{rad} = \frac{T|a|^2}{Z_{air}}.$$

In terms of energy, $$W_{rad} = \frac{2\pi}{\omega} P_{rad}.$$

The stored energy in the resonator in each cycle is twice the energy density of a single reflection multiplied by the length of the cavity, $$W_{stored} = 2\frac{P_{stored}}{c}L = 2\frac{\frac{|a|^2}{2Z_{air}}}{c}L = \frac{|a|^2 L}{Z_{air}c}.$$

Finally, this results in $$Q_{rad} \equiv Q_{unloaded} \equiv 2\pi \frac{W_{stored}}{W_{rad}} = \frac{\omega L}{Tc} = \frac{2\pi}{T} \quad (15)$$

(where again, T is the power transmission coefficient from Eq. (14) rather than the period).

Now, using $Q_{loaded}$ and $Q_{unloaded}$, coupled mode theory can be used to make a first-order approximation for the amount of power radiated from the cavity.

$$\frac{da}{dt} = (i\omega_0 - \gamma)a + \kappa s_{inc} \quad (16)$$

Here, a is the mode amplitude in the cavity, $\omega_0$ is the cavity's resonance frequency, $$\gamma = \gamma_{loaded} + \gamma_{unloaded} = \frac{\omega_0}{2Q}$$

is the total decay rate, c is the coupling coefficient, and $s_{inc}$ is the input waveform. Assuming that the cavity is operated at the CNZ frequency, then $\omega = \omega_0$ and $s_{inc} = e^{i\omega_0 t}$. From this, $$a = \frac{\kappa}{\gamma} \quad (17)$$

And, given that $\kappa^2 = 2\gamma_{loaded}$, then $$P_{rad} = 2\gamma_{rad}|a|^2 = 2\gamma_{rad}\frac{|\kappa|^2}{\gamma^2} = \frac{4\gamma_{rad}\gamma_{loaded}}{(\gamma_{rad} + \gamma_{loaded})^2} = \frac{4Q_{rad}Q_{loaded}}{(Q_{rad} + Q_{loaded})^2} \quad (18)$$

where in the final expression $$\gamma_{rad} = \frac{\omega_0}{2Q_{rad}}$$

and $$\gamma_{loaded} = \frac{\omega_0}{2Q_{loaded}}.$$

This expression can now be used to approximate the power radiated from the cavity with an acoustic boundary of finite thickness and finite impedance.

For illustrative purposes, two cases are considered:
(1) $f_0 = 763$ Hz, corresponding to the examples presented in FIGS. 3A-3C to FIGS. 7A-7B, having an intermediate channel with a width of 45 cm, but now with a steel wall of finite thickness 1.5 mm (rather than an ideal hard boundary).
(2) $f_0 = 10,000$ Hz, corresponding to a power divider that has all dimensions downscaled proportionally to case 1, resulting in a significantly smaller channel width of 3.4 cm, however having the same steel wall thickness of 1.5 mm.

From Eq. (14), the first case results in $T \approx 2.25 \cdot 10^{-4}$ and $Q_{rad} = 2.80 \cdot 10^4$. Combining these values with the numerical results of $Q_{loaded} \approx 7500$, from Eq. (18) $P_{rad} \approx 0.67$ (and there is very high radiation loss at this size scale). In the second case, it is assumed that the scalability property of the lossless Helmholtz equation ensures that the loaded quality factor of the smaller power divider in case 2 will remain the same as in case 1 (this fact was also verified numerically). Then, given the new value of $k_{steel}$ in Eq. (14), $T \approx 1.31 \cdot 10^{-6}$ and $Q_{rad} = 4.80 \cdot 10^6$, resulting in a much lower $P_{rad} \approx 0.01$ from Eq. (18). The significantly lower value for T in the second case (with a smaller intermediate channel) is expected intuitively, due to the walls being much thicker with respect to the wavelength, changing from $\lambda/l \approx 300$ in the first case to $\lambda/l \approx 23$ in the second case. These results highlight the concept that downscaling the size of the intermediate channel can significantly reduce radiation losses (assuming that the wall thickness will practically increase with respect to λ as the CNZ operating frequency increases).

Example 8. Considering the Influence of the Visco-Thermal Acoustic Boundary Layer Despite the theoretical benefits of downscaling the size of the system, one major barrier that exists is acoustic boundary layer loss, which results from the viscosity of the medium in contact with the boundary as well as the thermal conductivity of the waveguide perimeter. Due to this mechanism, it is expected that the losses within the input and output waveguides will increase as their sizes are decreased.

In order to counter-act the boundary layer loss due to the down scaling of the size of the power divider, the input/output waveguide sizes were increased relative to the intermediate channel and a parametric study was performed to test the restrictions of Eq. (13) on the performance of the power divider. FIGS. 8A-D depict the scaling limitations for the acoustic power divider. Increasing the size of the input waveguide results in a channel that no longer has uniform phase and the power division becomes uneven. It was observed that, as the size of the input waveguide is increased, both the phase uniformity and the impedance matching of the CNZ mode begin to degrade.

Figure 8B:
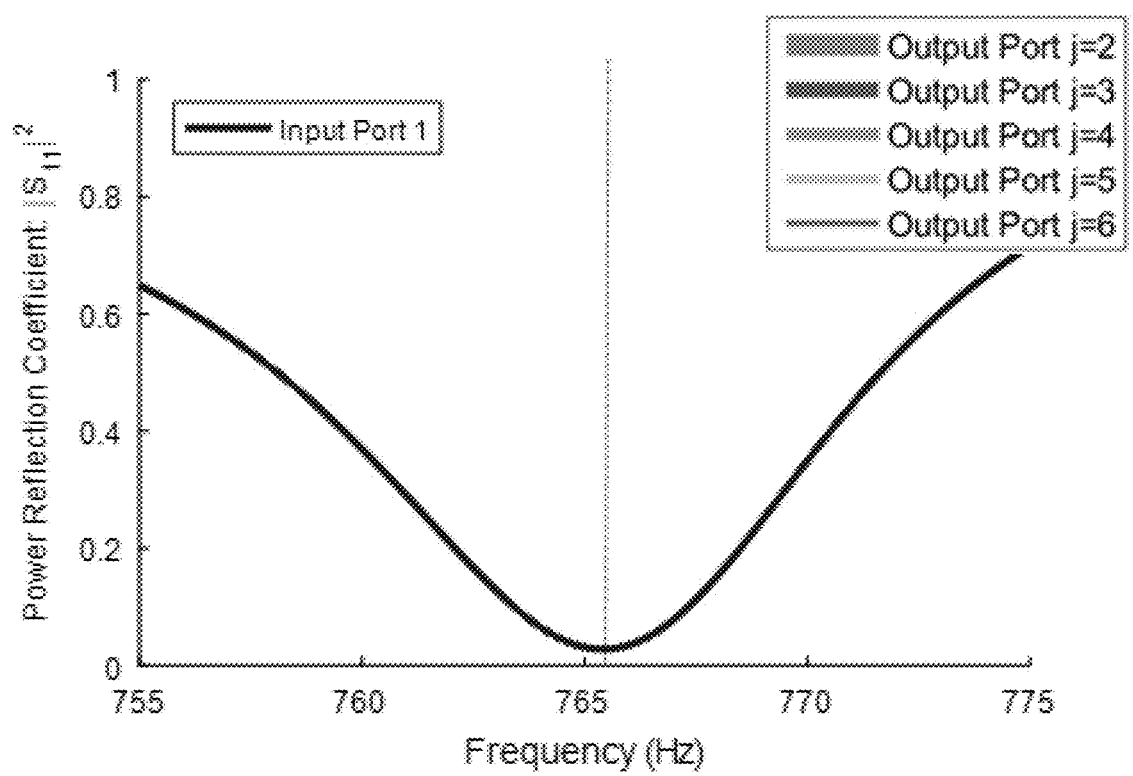

FIGS. 8A and 8B show an example of a case study where the radius of the largest waveguide is increased to a/8 (where a=0.450 m is the width of the intermediate channel) and the radii of all output waveguide ports 2-6 are equal to a/(8√5) in order to satisfy Eq. (12). The increased size of the waveguide radius with respect to the width of the intermediate channel results in degradation of impedance matching, increased reflected power, and uneven power division (with respect to the previous configurations of FIGS. 4A-4C, 5A-5D, 6A-6B, 7A-7B). Here, the power reflection coefficient reaches a minimum value of 0.03 and can be compared to previous configurations, which fully satisfied Eq. (13), and showed a minimum reflected power of 0. Additionally, as dictated by Eq. (12), it is expected to have power divided equally among the output ports with power transmission coefficient of 0.2 per output channel. However, in this case the power is distributed differently at each port, where the minimum power transmission coefficient is 0.181 at port 2 and port 4, and the maximum power transmission coefficient is 0.204 at ports 3, 5, and 6. This corresponds to a maximum variation in the power transmission coefficient of 11.5% with respect to the expected value of 0.2. The output transmission phase along the central ports (j=2,3,4) has increased from zero in the previous case (FIG. 3A-3B) to ~π/4 and varies by a maximum of 0.15 rad.

Figure 8C:
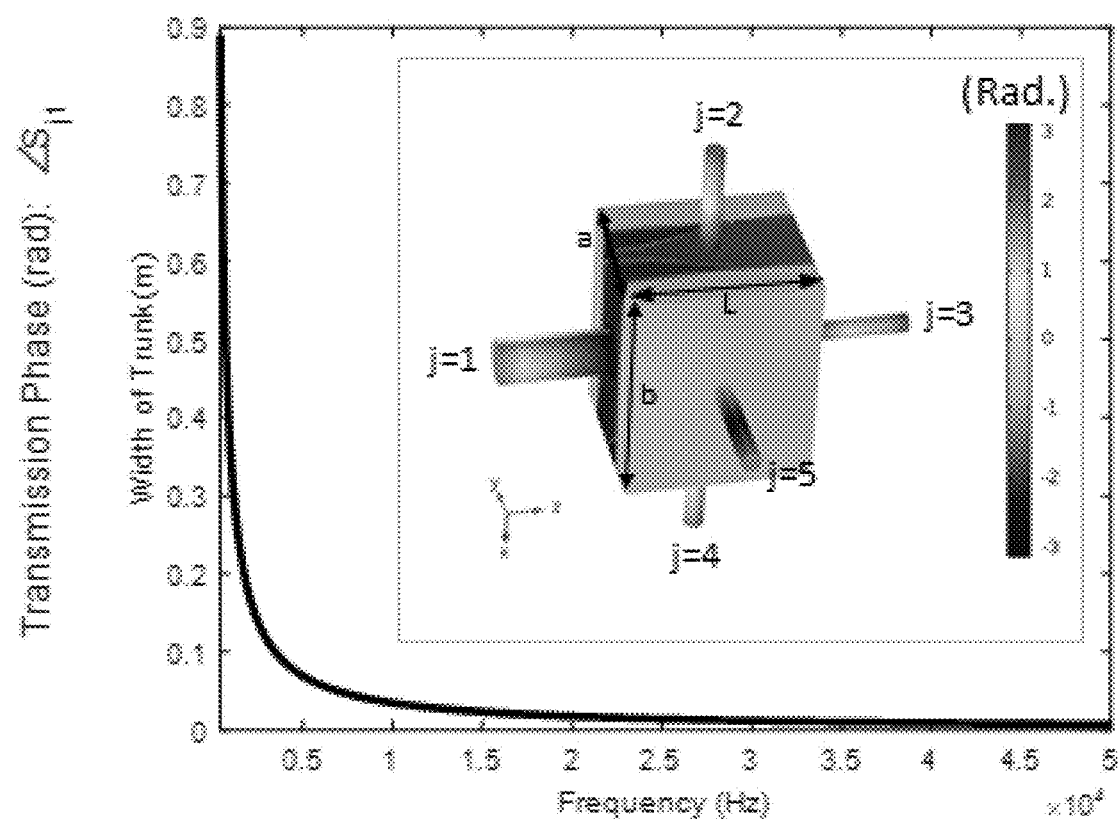
Figure 8D:
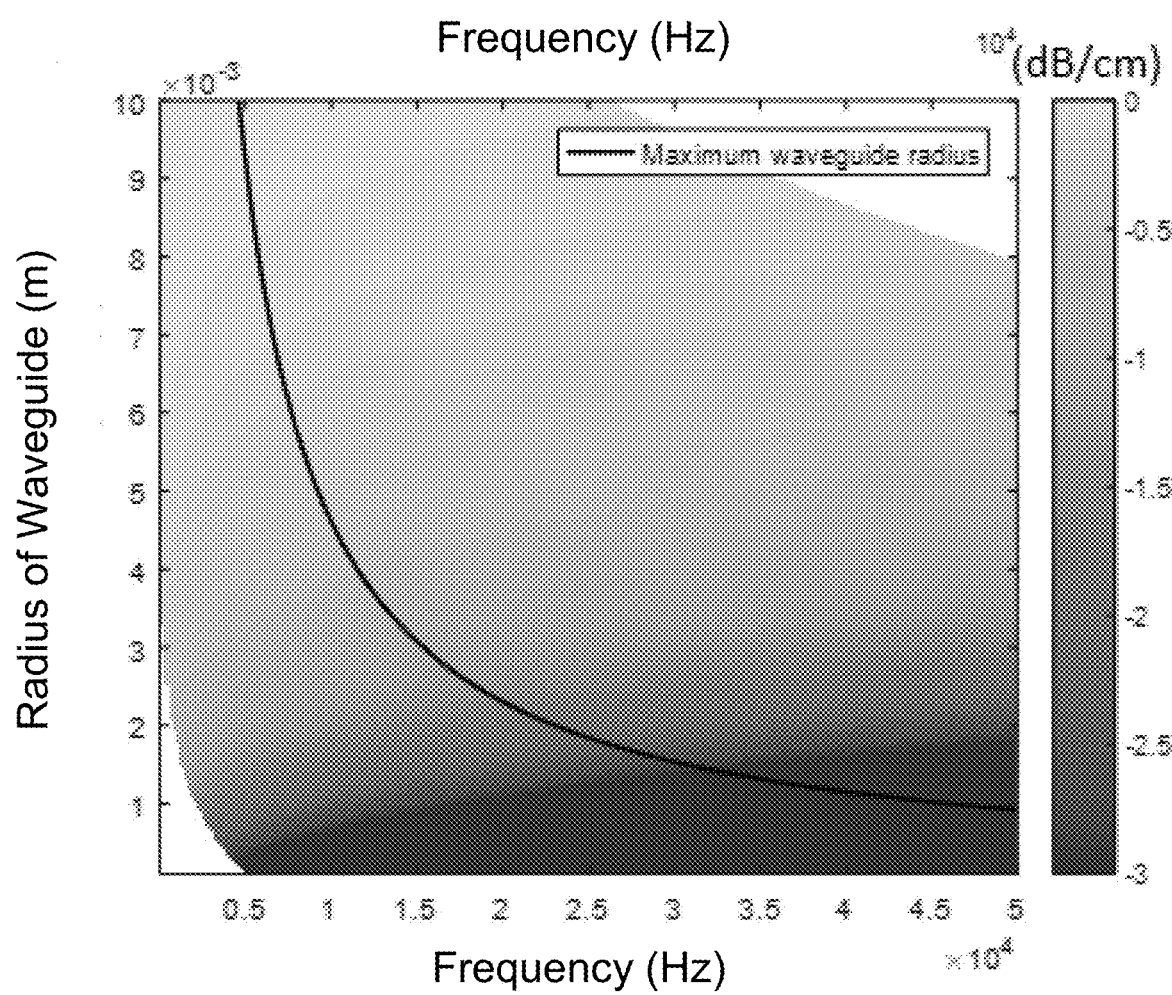

FIG. 8B shows the power reflection coefficient for an input waveguide radius of a/8, which has been degraded to 0.03 (compared to the 0 power reflection coefficient of FIGS. 7A-7B) FIG. 8C shows the variation of the CNZ frequency for a hard-hard channel (where uniform-phase power division can be achieved) as a function of the width of the channel, a. FIG. 8D shows the visco-thermal acoustic boundary layer loss as a function of frequency and waveguide radius. The black curve represents the limit where input radius reaches to a/8. Below the black curve, all choices of radius and frequency can result in power dividers with approximately uniform phase and equal power splitting. Note the units of loss are dB/cm.

The amount of boundary layer loss at various size scales can also be quantified. By considering the scale invariance of the Helmholtz equation in the waveguides and intermediate channel (without boundary layer loss), all dimensions of the power divider can be decreased proportionally while the frequency is increased, such that the size of each dimension with respect to λ stays constant. This theoretically yields a device with identical performance, except for the considerations of visco-thermal loss, which depends upon both the frequency and the dimension of each waveguide, and the radiation loss that depends upon the thickness of the waveguide and intermediate channel. Previously, it has been shown that radiation loss can be controlled independently by setting the thickness of the walls of the intermediate channel. The boundary layer loss upon scaling the power divider can be predicted by considering the smallest waveguide in the system, which is the limiting factor that produces the greatest amount of loss.

The particle velocity in that waveguide can be expressed as $u=u_0 e^{-\alpha z} e^{j(\omega t - \beta z)}$, where for a gas medium, $$\alpha = -Im\left\{\frac{\omega/c_0}{\sqrt{1-\frac{2}{a}\left(1+\frac{\gamma-1}{\sqrt{Pr}}\right)\sqrt{\frac{V}{j\omega}}}}\right\} \quad (19)$$

with a being the radius of the cylindrical waveguide, γ the ratio of specific heats, Pr is the Prandtl number, and υ is the kinematic viscosity. By assuming standard atmospheric conditions in air, the implications of Eq. (19) are considered in FIG. 8D. This figure shows the maximum waveguide radius (black curve), which represents the degradation level examined in FIGS. 8A and 8B. The radius that corresponds to this degradation level can be considered the maximum acceptable tolerance. Then it is possible to construct an acoustic power divider within an acceptable phase and amplitude variation range by selecting any point in FIG. 8D below the black curve. Moving to the right on the x-axis of the plot (changing the frequency) will result in downscaling the dimension of the coupling channel (where a=λ), while moving down on the y-axis (reducing the size of the smallest waveguide in the system) will improve the phase uniformity.

Accordingly, it can be seen from Examples 1-6 that improved phase uniformity comes at the cost of increased boundary-layer loss. Therefore, careful consideration of the signal requirements for each application should be made before choosing the size of the channel, the size of the input/output waveguides, and the frequency of a given device. Finally, it should be noted that phase uniformity can also be improved by increasing the height of the channel (b), which should have a negligible impact on the operating frequency (CNZ frequency) of the power divider, as shown by B. Edwards, et al., "Reflectionless sharp bends and corners in waveguides using epsilon-near-zero effects," *J. Appl. Phys.* 105, 044905 (2009).

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A supercoupling power divider, comprising
an acoustic input port having an input cross-sectional area, where the acoustic input port is adapted for receiving an acoustic signal having an impedance;
two or more acoustic output ports, each acoustic output port having an output cross-sectional area, where the combined output cross-sectional areas of the two or more output ports is equal to the input cross-sectional area, and where the two or more acoustic output ports are adapted for transmitting the acoustic signal; and
an acoustic path extending from the acoustic input port to the two or more acoustic output ports, the acoustic path having a variable length and a path cross-sectional area that is greater than the first cross-sectional area
wherein acoustic impedance at the acoustic input port is equal to the combined acoustic impedances at the two or more acoustic output ports.

2. The supercoupling power divider of claim 1, wherein the acoustic path exhibits compressibility-near-zero (CNZ) acoustic supercoupling.

3. The supercoupling power divider of claim 1, wherein the acoustic input port receives the acoustic signal from an input waveguide.

4. The supercoupling power divider of claim 3, where the acoustic signal is provided by an acoustic signal source in communication with the input waveguide.

5. The supercoupling power divider of claim 4, where the acoustic signal source is selected from the group consisting of drivers, speakers, and horns.

6. The supercoupling power divider of claim 1, wherein the two or more acoustic output ports transmit the acoustic signal through output waveguides.

7. The supercoupling power divider of claim 1, where the acoustic path comprises an air-filled channel and a boundary layer comprising a material having a Young's modulus (E) that is about 200 GPa or greater.

8. The supercoupling power divider of claim 7, wherein the boundary layer minimizes losses due to viscothermal boundary effects.

9. The supercoupling power divider of claim 1, wherein the acoustic path has a path cross-sectional area that is at least 16 times greater than the input cross-sectional area.

10. The supercoupling power divider of claim 1, wherein the acoustic path comprises a first resonant mode and a second resonant mode, wherein the second resonant mode does not interfere with the first resonant mode.

11. The supercoupling power divider of claim 1, wherein the output cross-sectional areas of each of the two or more output ports is the same, and the acoustic impedance at the two or more output ports is the same.

12. The supercoupling power divider of claim 1, wherein the output cross-sectional areas of each of the two or more output ports is different, and the acoustic impedance at each of the two or more output ports is proportional to its output cross-sectional area.

13. A method for achieving supercoupling in an acoustic path, comprising:
providing an acoustic path comprising an air-filled channel and a boundary layer comprising a material having a Young's modulus (E) that is about 200 GPa or greater, where the acoustic path has an acoustic input port and at least two acoustic output ports;
providing a signal having an impedance at the acoustic input port, where the signal is transmitted through the acoustic path to the at least two acoustic output ports,
wherein the total signal at the at least two acoustic output ports has an impedance equal to the impedance of the signal at the acoustic input port.

14. The method of claim 13, wherein the acoustic path exhibits compressibility-near-zero (CNZ) acoustic supercoupling.

15. The method of claim 13, wherein the acoustic input port receives the signal from an input waveguide.

16. The method of claim 15, where the signal is provided by an acoustic signal source in communication with the input waveguide.

17. The method of claim 13, where the acoustic path comprises an air-filled channel and a boundary layer comprising a material having a Young's modulus (E) that is about 200 GPa or greater.

18. The method of claim 13, wherein the acoustic path comprises a first resonant mode and a second resonant mode, wherein the second resonant mode does not interfere with the first resonant mode.

19. The method of claim 13, wherein the output cross-sectional areas of each of the two or more output ports is the same, and the acoustic impedance at the two or more output ports is the same.

20. The method of claim 13, wherein the output cross-sectional areas of each of the two or more output ports is different, and the acoustic impedance at each of the two or more output ports is proportional to its cross-sectional area.

* * * * *